United States Patent
Wang

(10) Patent No.: US 11,265,092 B2
(45) Date of Patent: Mar. 1, 2022

(54) NETWORK CONNECTION METHOD AND DEVICE FOR ENSURING NETWORK CONNECTIVITY IN A NEWLY CONNECTED ROUTING DEVICE

(71) Applicant: HUAWEI TECHNOLOGIES CO., LTD., Guangdong (CN)

(72) Inventor: Jian Wang, Wuhan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 66 days.

(21) Appl. No.: 16/756,712

(22) PCT Filed: Oct. 17, 2017

(86) PCT No.: PCT/CN2017/106596
§ 371 (c)(1),
(2) Date: Apr. 16, 2020

(87) PCT Pub. No.: WO2019/075647
PCT Pub. Date: Apr. 25, 2019

(65) Prior Publication Data
US 2020/0266905 A1    Aug. 20, 2020

(51) Int. Cl.
*H04B 17/318* (2015.01)
*H04W 76/10* (2018.01)
(Continued)

(52) U.S. Cl.
CPC ......... *H04B 17/318* (2015.01); *H04L 12/189* (2013.01); *H04L 43/10* (2013.01);
(Continued)

(58) Field of Classification Search
CPC .... H04B 17/318; H04W 76/10; H04W 24/08; H04W 84/12; H04W 84/20; H04L 12/189; H04L 43/10; H04L 45/22; H04L 29/06
See application file for complete search history.

(56) References Cited

U.S. PATENT DOCUMENTS

2002/0055978 A1*  5/2002  Joon-Bo ............... H04W 84/20
                                                                    709/209
2014/0376377 A1   12/2014  Mikoda et al.
(Continued)

FOREIGN PATENT DOCUMENTS

CN          102548038 A       7/2012
CN          103167631 A       6/2013
(Continued)

OTHER PUBLICATIONS

Antonio M. Ortiz et al.,"Adaptive routing for multihop IEEE 802.15.6 Wireless Body Area Networks",SoftCOM 2012, 20th International Conference on Software, Telecommunications and Computer Networks,total 5 pages.
(Continued)

*Primary Examiner* — Walli Z Butt
(74) *Attorney, Agent, or Firm* — Womble Bond Dickinson (US) LLP

(57) ABSTRACT

A network connection method and a device. The method includes: determining, by a routing device, a connectivity state and link quality, where the connectivity state is used to indicate a connectivity state between the routing device and a master device, and the link quality is used to indicate link quality of the routing device; the routing device is the master device or a slave device; and the master device is directly connected to a network side, and the slave device is directly or indirectly connected to the master device; and broadcast-
(Continued)

ing, by the routing device, a first message, where the first message includes the connectivity state and the link quality.

17 Claims, 13 Drawing Sheets

(51) Int. Cl.
    *H04L 12/18*     (2006.01)
    *H04L 43/10*     (2022.01)
    *H04W 24/08*     (2009.01)
    *H04W 84/12*     (2009.01)

(52) U.S. Cl.
    CPC .......... *H04W 24/08* (2013.01); *H04W 76/10* (2018.02); *H04W 84/12* (2013.01)

(56) References Cited

U.S. PATENT DOCUMENTS

2016/0165567 A1* 6/2016 Liu ...................... H04B 17/318 455/456.2
2017/0070854 A1 3/2017 Poola et al.
2017/0353926 A1* 12/2017 Zhu ................... H04W 52/0216
2019/0302267 A1* 10/2019 Morita ............... G06K 9/00201

FOREIGN PATENT DOCUMENTS

| | | |
|---|---|---|
| CN | 104683248 A | 6/2015 |
| CN | 105871717 A | 8/2016 |
| CN | 105873083 A | 8/2016 |
| CN | 106060816 A | 10/2016 |
| CN | 106506697 A | 3/2017 |
| CN | 107124729 A | 9/2017 |
| WO | 2006138326 A1 | 12/2006 |

OTHER PUBLICATIONS

Lin Luo et al.,"End-to-end performance aware association mechanism for wireless municipal mesh networks", Computer Communications 31 (2008),pp. 1602-1614.

* cited by examiner

NETWORK CONNECTION METHOD AND DEVICE FOR ENSURING NETWORK CONNECTIVITY IN A NEWLY CONNECTED ROUTING DEVICE

CROSS REFERENCE TO RELATED APPLICATIONS

This application is a national stage of International Application No. PCT/CN2017/106596, filed on Oct. 17, 2017, which is herein incorporated by reference in its entirety.

TECHNICAL FIELD

Embodiments of this application relate to the communications field, and in particular, to a network connection method and a device.

BACKGROUND

If Wi-Fi signal coverage in a home environment is not good, a common solution is to switch to a high-power wireless router or use a Wi-Fi repeater. However, for other household scenarios in which there are many rooms, thick walls, or a plurality of floors in a Wi-Fi coverage place, or the like, this solution is often not so effective. On one hand, to configure networking parameters, specific professional knowledge is required. On the other hand, maintenance in a later period is inconvenient, and a Wi-Fi mobile experience effect is not ideal.

An existing intelligent connection protocol (HiLink) allows a newly connected routing device to automatically complete learning of Wi-Fi parameters, for example, including a Wi-Fi name, a password, and a login password for an administration page. The newly connected routing device can be quickly connected to a current network without manual configuration of networking parameters. Therefore, for an area with relatively weak Wi-Fi signal coverage, the Wi-Fi signal coverage can be enhanced by connecting a new routing device to a network.

However, in a multi-level scenario, when a routing device is connected to a current network for the first time or reconnected to the current network after disconnection, the routing device may be connected to a routing device that has no network connectivity, or connected to a routing device with very weak Wi-Fi signal strength. As a result, the newly connected device has no network connectivity, and has no connectivity to the network side.

SUMMARY

Embodiments of the present invention provide a network connection method and a device, to avoid a case in which a newly connected routing device has no network connectivity.

According to a first aspect, a network system is disclosed, including at least two routing devices, where the at least two routing devices include a master device and at least one slave device. The master device is directly connected to a network side, and the at least one slave device is directly or indirectly connected to the master device. Each routing device broadcasts a first message, where the first message includes a connectivity state and link quality, and the connectivity state is used to indicate a connectivity state between the routing device and the master device, and the link quality is used to indicate link quality of the routing device.

The routing device in the network system provided in this embodiment of the present invention broadcasts its own link quality and connectivity state to the outside, so that a to-be-connected device can learn, by scanning first messages broadcast by routing devices, whether each routing device is connected to the master device and link quality of each routing device, so as to connect to a routing device that has connectivity to the master device and has better link quality, thereby acquiring relatively good network experience.

With reference to the first aspect, in a first possible implementation of the first aspect, the network system further includes a to-be-connected device. The to-be-connected device receives at least two of the first messages broadcast by the at least two routing devices; and determines, based on the at least two first messages, at least one first-type routing device in the at least two routing devices that has connectivity to the master device. Then, the to-be-connected device obtains received signal strength of the at least one first-type routing device, and the to-be-connected device may further calculate, based on link quality in a first message broadcast by the at least one first-type routing device and the signal strength of the at least one first-type routing device, effective link quality between the to-be-connected device and each of the first-type routing device; and finally, the to-be-connected device connects to a routing device with best link quality with the to-be-connected device in the first-type routing devices.

It can be learned that, in this embodiment of the present invention, a device to be connected to the network scans networking messages broadcast by routing devices in the network, and may determine, based on link quality and a connectivity state in a networking message broadcast by each routing device and signal strength of each routing device scanned by the to-be-connected device, a routing device that has connectivity to the master device and that has best network quality. In this way, the to-be-connected device can connect to the routing device with the best network quality. Therefore, every level of routing device in the network can independently select an optimal link reaching the master device, to connect to the master device, avoiding a case in which a connected routing device has no network connectivity. This can satisfy that a terminal device can obtain best Internet accessing experience by connecting to any level of routing device in the network.

With reference to the first aspect or the first possible implementation of the first aspect, in a second possible implementation of the first aspect, if the routing device is the master device, the connectivity state is connected.

In other words, a connectivity state in a first message broadcast by the master device is connected by default.

According to a second aspect, a network connection method is disclosed, including:

determining, by a routing device, a connectivity state and link quality, where the connectivity state is used to indicate a connectivity state between the routing device and a master device, and the link quality is used to indicate link quality of the routing device; the routing device is the master device or a slave device; and the master device is directly connected to a network side, and the slave device is directly or indirectly connected to the master device; and broadcasting, by the routing device, a first message, where the first message includes the connectivity state and the link quality.

In the method provided in this embodiment of the present invention, the routing device broadcasts its link quality and connectivity state to the outside, so that a to-be-connected device can learn, by scanning first message broadcasts by routing devices, whether each routing device is connected to the master device and link quality of each routing device, so as to connect to a routing device that has connectivity to the master device and has better link quality, thereby acquiring relatively good network experience.

With reference to the second aspect, in a first possible implementation of the second aspect, the method further includes: determining, by the routing device, a startup state, where the startup state is used to indicate whether the routing device is started within preset duration. In this case, the first message broadcast by the routing device may further include the startup state.

Specifically, the startup state may be used to indicate whether the routing device is just started, and the to-be-connected device may further determine, based on the startup state in the first message broadcast by the routing device, whether the routing device is just started, and determine, based on a determining result, whether to connect to the routing device.

With reference to the second aspect or the first possible implementation of the second aspect, in a second possible implementation of the second aspect, if the routing device is the master device, the routing device determines, by default, that the connectivity state of the routing device is connected.

In other words, the connectivity state in the first message broadcast by the master device is connected by default.

With reference to the second aspect or any of the foregoing possible implementations of the second aspect, in a third possible implementation of the second aspect, if the routing device is the slave device, the determining, by a routing device, a connectivity state specifically includes: receiving, by the routing device, a first message broadcast by an upstream device, and using a connectivity state in the first message broadcast by the upstream device as the connectivity state; or detecting, by the routing device, a connectivity state with the master device periodically, and determining the connectivity state based on a detection result; or sending, by the routing device, a heartbeat packet to the master device periodically, and determining the connectivity state based on reception of the heartbeat packet by the master device.

In other words, if the routing device determines, by receiving the first message broadcast by the upstream device, a connectivity state between the upstream device and the master device, and further determines that the connectivity state of the routing device is the same as the connectivity state of the upstream device by receiving the first message broadcast by the upstream device; or the routing device may proactively detect whether the routing device has connectivity to the master device. In this way, the routing device can broadcast the connectivity state between the routing device and the master device to the outside, so that a to-be-connected routing device chooses to connect to a routing device that has connectivity to the master device.

With reference to the second aspect and any one of the foregoing possible implementations of the second aspect, in a fourth possible implementation of the second aspect, the determining, by the routing device, the connectivity state based on a detection result specifically includes: if the detection result is that the routing device is disconnected from the master device, determining that the connectivity state is a first value, where the first value is used to indicate that the routing device has no connectivity to the master device; and if the detection result is that the routing device is connected to the master device, determining that the connectivity state is a second value, where the second value is used to indicate that the routing device has connectivity to the master device.

Therefore, two values may be used to represent the connectivity state of the routing device, so that after scanning the first message broadcast by the routing device, the to-be-connected device parses the first message, and further determines, based on the first value or the second value in the first message, whether the routing device has connectivity to the master device.

With reference to the second aspect and any one of the foregoing possible implementations of the second aspect, in a fifth possible implementation of the second aspect, the determining, by the routing device, the connectivity state based on reception of the heartbeat packet by the master device specifically includes: if the routing device determines that the master device has received the heartbeat packet, determining that the connectivity state is a second value, where the second value is used to indicate that the routing device has connectivity to the master device; and if the routing device determines that none of heartbeat packets consecutively sent N times is received by the master device, determining that the connectivity state is a first value, where the first value is used to indicate that the routing device has no connectivity to the master device; and N is an integer greater than 1.

In other words, after the routing device sends a heartbeat packet to the master device, if the routing device receives a reply from the master device, the routing device considers that the master device has received the heartbeat packet from the routing device, then the routing device may consider that itself has connectivity to the master device; once the routing device does not receive a reply from the master device after sending the heartbeat packet a plurality of times, the routing device may consider that itself has no connectivity to the master device. Therefore, different values are determined based on reception of the heartbeat packet, so that after scanning the first message broadcast by the routing device, the to-be-connected device parses the first message, and further determines, based on the first value or the second value in the first message, whether the routing device has connectivity to the master device.

With reference to the second aspect and any one of the foregoing possible implementations of the second aspect, in a sixth possible implementation of the second aspect, the determining, by a routing device, link quality specifically includes: determining, by the routing device, link quality of the upstream device and a received signal strength indicator RSSI value between the routing device and the upstream device; if the link quality of the upstream device is less than the RSSI value, determining that the link quality is a sum of the link quality of the upstream device and a link attenuation value; or if the RSSI value is less than the link quality of the upstream device, determining that the link quality is a sum of the RSSI value and a link attenuation value, where the link attenuation value is a signal attenuation quantity on a link between the routing device and the upstream device.

If link quality of an upstream device of a routing device is very good, but signal quality between the routing device and the upstream device is very poor, link quality of the routing device may be relatively poor. In other words, none of an RSSI value between the routing device and the upstream device and the link quality of the upstream device can represent the link quality of the routing device. Therefore, when calculating the link quality of the routing device, the routing device needs to consider the RSSI value between the routing device and the upstream device and the link quality of the upstream device, and use a value obtained by adding up a link attenuation value and a smaller value between the RSSI value between the routing device and the upstream device and the link quality of the upstream device, as the link quality of the routing device, to represent a true link capability of the routing device.

With reference to the second aspect and any one of the foregoing possible implementations of the second aspect, in a seventh possible implementation of the second aspect, the determining, by the routing device, link quality of the upstream device specifically includes: receiving the first message broadcast by the upstream device, and determining link quality in the first message broadcast by the upstream device as the link quality of the upstream device; or receiving the link quality of the upstream device sent by the master device.

In a specific implementation, when there is a wired connection between the routing device and the upstream device are wired connection, that is, a user needs to manually connect the routing device to a network. Therefore, the routing device does not know link quality of the upstream device and needs to obtain the link quality of the upstream device from the master device. Only when a premise is that the master device knows a topological structure of the entire network and link quality of each routing device in the network, the master device can send link quality of an upstream device of a routing device to the routing device. If the routing device joins the network in an automatic scanning manner (that is, the network connection method provided in this embodiment of the present invention), the routing device can obtain the link quality of the upstream device in a first message broadcast by the upstream device.

With reference to the second aspect and any one of the foregoing possible implementations of the second aspect, in an eighth possible implementation of the second aspect, the determining, by the routing device, an RSSI value between the routing device and the upstream device specifically includes: if the link between the routing device and the upstream device is a wired link, determining that the RSSI value is zero; or measuring, by the routing device, the RSSI value if the link between the routing device and the upstream device is a wireless link.

Usually, an RSSI value is used to indicate signal strength between devices. Due to factors such as a distance and an obstacle between devices, an RSSI value between the devices is attenuated, and is usually a value less than 0. If the link between the routing device and the upstream device is a wired link, it may be considered that signal strength between the upstream device and a downstream device is not attenuated, and the RSSI value between the routing device and the upstream device is 0 by default. If the link between the routing device and the upstream device is a wireless link, when the routing device scans a signal broadcast by the upstream device (for example, a Wi-Fi signal), the RSSI value between the routing device and the upstream device may be measured and the value may be a value less than 0.

According to a third aspect, a network connection method is disclosed, where the method includes: receiving, by a to-be-connected device, at least two first messages broadcast by at least two routing devices, where the first message includes link quality and a connectivity state of a routing device that broadcasts the first message; the connectivity state is used to indicate a connectivity state between the routing device that broadcasts the first message and a master device and the link quality is used to indicate link quality of the routing device that broadcasts the first message; and it should be noted that the master device is directly connected to a network side; then, determining, by the to-be-connected device based on the at least two first messages, at least one first-type routing device in the at least two routing devices that has connectivity to the master device; obtaining, by the to-be-connected device, received signal strength of the at least one first-type routing device and further calculating effective link quality between the to-be-connected device and each first-type routing device based on link quality in a first message broadcast by the at least one first-type routing device and the signal strength of the at least one first-type routing device; and finally, connecting the to-be-connected device to a routing device with the best link quality with the to-be-connected device in the at least one first-type routing device.

In this embodiment of the present invention, a device to be connected to the network scans networking messages broadcast by routing devices in the network, and may determine, based on link quality and a connectivity state in a networking message broadcast by each routing device and signal strength of each routing device scanned by the to-be-connected device, a routing device that has connectivity to the master device and that has best network quality. In this way, the to-be-connected device can connect to the routing device with the best network quality. Therefore, every level of routing device in the network can independently select an optimal link reaching the master device, to connect to the master device, avoiding a case in which a connected routing device has no network connectivity. This can satisfy that a terminal device can obtain best Internet accessing experience by connecting to any level of routing device in the network.

With reference to the third aspect, in a first possible implementation of the third aspect, the first message further includes: a startup state. The startup state is used to indicate whether the routing device that broadcasts the first message is started within preset duration.

Specifically, the startup state may be used to indicate whether the routing device is just started, and the to-be-connected device may further determine, based on the startup state in the first message broadcast by the routing device, whether the routing device is just started, and determine, based on a determining result, whether to connect to the routing device.

With reference to the third aspect or the first possible implementation of the third aspect, in a second possible implementation of the third aspect, the method further includes: if there is no first-type routing device in the at least two routing devices, determining, based on a startup state in the at least two first messages, whether there is a second-type routing device that is started within preset duration in the at least two routing devices; and if there is the second-type routing device in the at least two routing devices, receiving again, by the to-be-connected device after waiting for specific duration, a first message broadcast by the at least two routing devices.

In other words, if none of routing devices scanned by the to-be-connected device has connectivity to the master device, but there are routing devices that are just started in these routing devices. For these routing devices that are just started, signals of the routing devices are still unstable. Therefore, connectivity states in first messages broadcast by the routing devices are disconnected. In this case, the to-be-connected device may perform scanning again after waiting for a specific time period. At this time, the signals of the routing devices are stable, and a connectivity state in a first message broadcast can better represent a true connectivity state between a routing device and the master device.

With reference to the third aspect or either of the foregoing possible implementations, in a third possible implementation of the third aspect, the calculating, by the to-beconnected device, that the to-be-connected device calculates effective link quality between the to-be-connected device and each first-type routing device based on link quality in a first message broadcast by the at least one first-type routing device specifically includes: for each of a first-type networking devices, calculating the effective link quality between the to-be-connected device and the first-type routing device=the link quality of the first-type routing device+(a received signal strength indicator RSSI value/n between the first-type routing device and the to-be-connected device/n), where n is a number greater than 1.

Therefore, since link quality between the to-be-connected device and a routing device is affected by link quality of the routing device and an RSSI value between the device and the to-be-connected device, the to-be-connected device may calculate, based on the foregoing formula, effective link quality with each first-type routing device to select a routing device with best link quality to connect.

According to a fourth aspect, a routing device is disclosed, including: a determining unit, configured to determine a connectivity state and link quality, where the connectivity state is used to indicate a connectivity state between the routing device and a master device, and the link quality is used to indicate link quality of the routing device; the routing device is the master device or a slave device; and the master device is directly connected to a network side, and the slave device is directly or indirectly connected to the master device; and a sending unit, configured to broadcast a first message, where the first message includes the connectivity state and the link quality.

With reference to the fourth aspect, in a first possible implementation of the fourth aspect, the determining unit is further configured to determine a startup state, where the startup state is used to indicate whether the routing device is started within preset duration; and the first message further includes the startup state.

With reference to the fourth aspect or the first possible implementation of the fourth aspect, in a second possible implementation of the fourth aspect, if the routing device is the master device, the determining unit is specifically configured to determine that the connectivity state is connected.

With reference to the fourth aspect or either of the foregoing possible implementations, in a third possible implementation of the fourth aspect, if the routing device is the slave device, the routing device further includes a receiving unit, where the receiving unit is configured to receive a first message broadcast by an upstream device; the determining unit is specifically configured to use a connectivity state in the first message broadcast by the upstream device as the connectivity state; or the determining unit is specifically configured to detect a connectivity state with the master device periodically, and determine the connectivity state based on a detection result; or the sending unit is further configured to send a heartbeat packet to the master device periodically; and the determining unit is specifically configured to determine the connectivity state based on reception of the heartbeat packet by the master device.

With reference to the fourth aspect and any one of the foregoing possible implementations of the fourth aspect, in a fourth possible implementation of the fourth aspect, the determining unit is specifically configured to: if the detection result is that the routing device is disconnected from the master device, determine that the connectivity state is a first value, where the first value is used to indicate that the routing device has no connectivity to the master device; and if the detection result is that the routing device is connected to the master device, determine that the connectivity state is a second value, where the second value is used to indicate that the routing device has connectivity to the master device.

With reference to the fourth aspect and any one of the foregoing possible implementations of the fourth aspect, in a fifth possible implementation of the fourth aspect, the determining unit is specifically configured to: if determining that the master device has received the heartbeat packet, determine that the connectivity state is a second value, where the second value is used to indicate that the routing device has connectivity to the master device; and if determining that none of heartbeat packets consecutively sent N times is received by the master device, determine that the connectivity state is a first value, where the first value is used to indicate that the routing device has no connectivity to the master device; and N is an integer greater than 1.

With reference to the fourth aspect and any one of the foregoing possible implementations of the fourth aspect, in a sixth possible implementation of the fourth aspect, the determining unit is specifically configured to determine link quality of the upstream device and a received signal strength indicator RSSI value between the routing device and the upstream device; and if the link quality of the upstream device is less than the RSSI value, determine that the link quality is a sum of the link quality of the upstream device and a link attenuation value; or if the RSSI value is less than the link quality of the upstream device, determine that the link quality is a sum of the RSSI value and a link attenuation value, where the link attenuation value is a signal attenuation quantity on a link between the routing device and the upstream device.

With reference to the fourth aspect and any one of the foregoing possible implementations of the fourth aspect, in a seventh possible implementation of the fourth aspect, the determining unit is specifically configured to: receive, by using the receiving unit, the first message broadcast by the upstream device, and determine link quality in the first message broadcast by the upstream device as the link quality of the upstream device; or receive, by using the receiving unit, link quality of the upstream device sent by the master device.

With reference to the fourth aspect and any one of the foregoing possible implementations of the fourth aspect, in an eighth possible implementation of the fourth aspect, the determining unit is specifically configured to: if the link between the routing device and the upstream device is a wired link, determine that the RSSI value is zero; or measure the RSSI value if the link between the routing device and the upstream device is a wireless link.

According to a fifth aspect, a to-be-connected device is disclosed, including: a receiving unit, configured to receive at least two first messages broadcast by at least two routing devices, where the first message includes link quality and a connectivity state of a routing device that broadcasts the first message; the connectivity state is used to indicate a connectivity state between the routing device that broadcasts the first message and a master device, and the link quality is used to indicate link quality of the routing device that broadcasts the first message; and the master device is directly connected to a network side; a determining unit, configured to determine, based on the at least two first messages, at least one first-type routing device in the at least two routing devices that has connectivity to the master device; an obtaining unit, configured to obtain received signal strength of the at least one first-type routing device; a calculation unit, configured to calculate effective link quality between the to-be-connected device and each first-type routing device based on link quality in a first message broadcast by the at least one first-type routing device and the signal strength of the at least one first-type routing device; and a connection unit, configured to connect to a routing device with the best link quality with the to-be-connected device in the at least one first-type routing device.

With reference to the fifth aspect, in a first possible implementation of the fifth aspect, the first message further includes a startup state, where the startup state is used to indicate whether the routing device that broadcasts the first message is started within preset duration.

With reference to the fifth aspect or the first possible implementation of the fifth aspect, in a second possible implementation of the fifth aspect, the determining unit is further configured to: if there is no first-type routing device in the at least two routing devices, determine, based on a startup state in the at least two first messages, whether there is a second-type routing device that is started within preset duration in the at least two routing devices; and the receiving unit is further configured to: if there is the second-type routing device in the at least two routing devices, receive again, after waiting for specific duration, a first message broadcast by the at least two routing devices.

With reference to the fifth aspect or either of the foregoing possible implementations, in a third possible implementation of the fifth aspect, the calculation unit is specifically configured to: for each first-type networking devices, calculate the effective link quality between the to-be-connected device and the first-type routing device=link quality of the first-type routing device+(a received signal strength indicator RSSI value between the first-type routing device and the to-be-connected device/n), where n is a number greater than 1.

According to a sixth aspect, a routing device is disclosed, including: one or more processors and one or more memories, where the one or more memories store one or more computer programs and the one or more computers programs include instructions; and when the instructions are executed by the one or more processors, the routing device is enabled to perform the network connection method according to any one of the second aspect and possible implementations of the second aspect.

According to a seventh aspect, a routing device is disclosed, where the routing device includes an apparatus for performing the network connection method according to any one of the second aspect and possible implementation of the second aspect.

According to an eighth aspect, a computer program product including an instruction is disclosed, where when the computer program product is run on a routing device, the routing device is enabled to perform the network connection method according to any one of the second aspect and possible implementation of the second aspect.

According to a ninth aspect, a computer readable storage medium is disclosed, where the computer readable storage medium includes an instruction; when the instruction is run on a routing device, the routing device is enabled to perform the network connection method according to any one of the second aspect and possible implementation of the second aspect.

According to a tenth aspect, a to-be-connected device is disclosed, including one or more processors and one or more memories, where the one or more computer programs store one or more computer programs and the one or more computer programs include instructions; and when the instructions are executed by the one or more processors, the to-be-connected device is enabled to perform the network connection method according to any one of the third aspect and possible implementation of the third aspect.

According to an eleventh aspect, a to-be-connected device is disclosed, where the to-be-connected device includes an apparatus for performing the network connection method according to any one of the third aspect and possible implementation of the third aspect.

According to a twelfth aspect, a computer program product including an instruction is disclosed, where when the computer program product is run on a to-be-connected device, the to-be-connected device is enabled to perform the network connection method according to any one of the third aspect and possible implementation of the third aspect.

According to a thirteenth aspect, a computer readable storage medium is disclosed, where the computer readable storage medium includes an instruction, and when the instruction is run on a to-be-connected device, the to-be-connected device is enabled to perform the network connection method according to any one of the third aspect and possible implementation of the third aspect.

For a specific description of the fourth aspect of this application and various implementations of the fourth aspect, refer to the detailed description in the second aspect and various implementations of the second aspect; and for beneficial effects of the fourth aspect and the various implementations of the fourth aspect, refer to analysis of the beneficial effects in the second aspect and the various implementations of the second aspect, and details are not described herein again. For a specific description of the fifth aspect and various implementations of the fifth aspect, refer to the detailed description in the third aspect and various implementations of the third aspect; and for beneficial effects of the fifth aspect and the various implementations of the fifth aspect, refer to analysis in the third aspect and the various implementations of the third aspect, and details are not described herein again.

DESCRIPTION OF EMBODIMENTS

Technical solutions in the embodiments of the present invention are described in detail below with reference to the accompanying drawings in the embodiment of the present invention.

Figure 1:
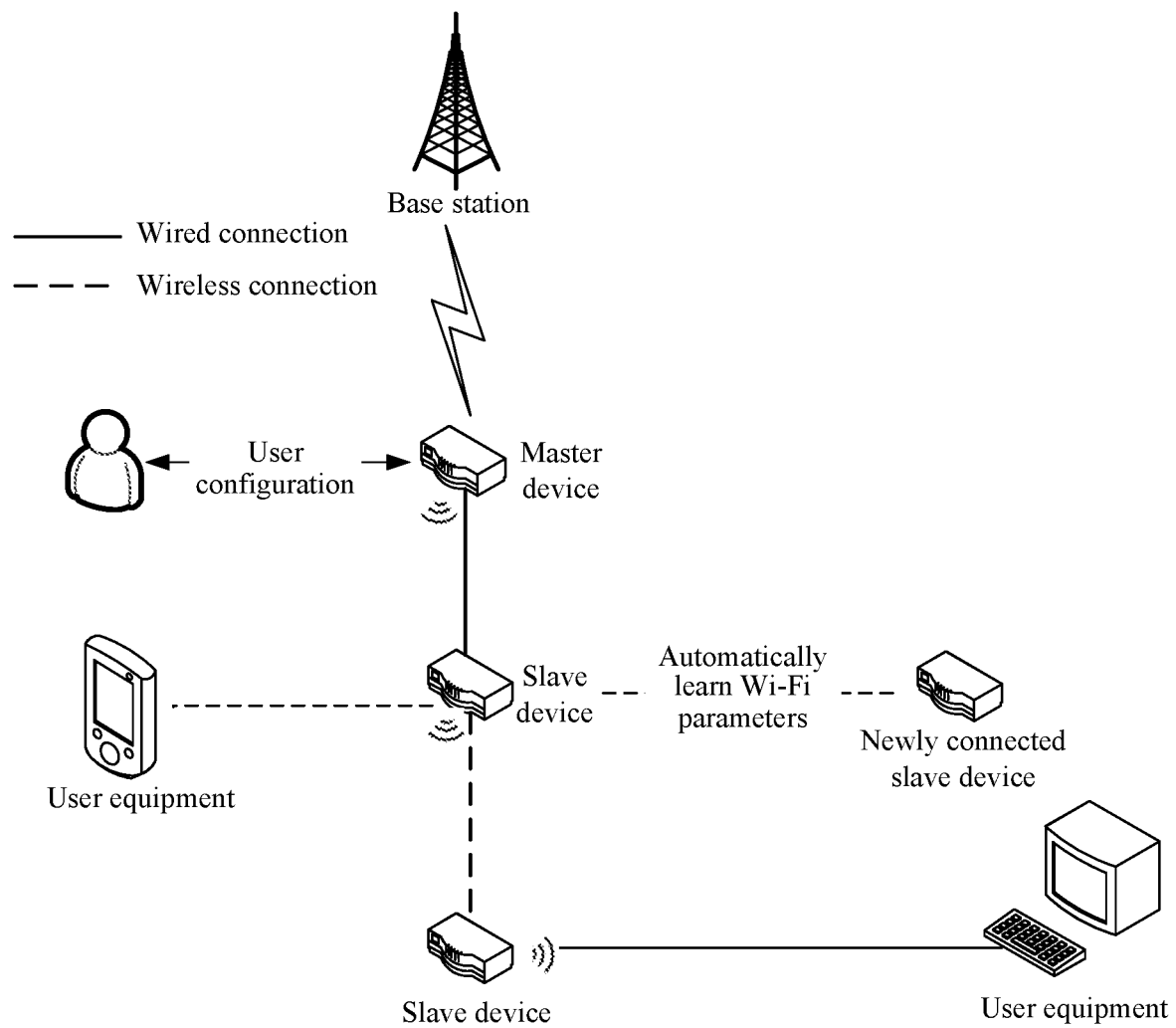
FIG. 1 is a principle diagram of a networking mode in the prior art.

FIG. 1 is a principle diagram of a networking mode in a distributed network system. The solutions provided in the embodiments of the present invention may be applied to the networking mode. The distributed network is a network, of a topological structure, formed by a plurality of nodes, and may be a multi-level networking system shown in FIG. 1, including a master device and at least one slave device, where the master device in the network is directly connected to a network side (wide area network). The slave device is a device, directly connected to the master device, in the network or a device indirectly connected to the master device through another slave device. Both the master device and the slave device are devices with a routing function. A master device and a slave device, or a slave device and another slave device may be connected in a wired manner, in a wireless manner, or through a power line.

As shown in FIG. 1, a user may add a new device to the network. A networking technology supports a newly-added device in automatically learning a Wi-Fi parameter, for example, a Wi-Fi name, a password, and a login password of an administration page. Referring to FIG. 1, a Wi-Fi name and a password of the master device are completely the same as those of each slave device in the network. When the user controls only a Wi-Fi parameter of the master device, the slave device can automatically learn the Wi-Fi parameter of the master device. In addition, user equipment may switch between a plurality of networks provided by the master device and the slave devices. In this networking mode, for an area with relatively weak Wi-Fi signal coverage, a slave device is added to connect to the network, and then the slave device provides a Wi-Fi signal to the outside, thereby increasing Wi-Fi signal coverage and strength. It should be noted that a connection between devices in the network is not limited to a Wi-Fi connection, and the devices may alternatively be connected through another wireless local area network connection technology. Certainly, if the devices in the network are connected through the another wireless local area network connection technology, the newly-added device automatically learns some connection parameters in the connection technology, for example, a user name and a password.

In this network, the Wi-Fi name and the password of the master device are the same as those of each slave device. A special channel is maintained between the master device and each slave device, for example, a universal plug and play (UPNP) channel. When the user only needs to modify the Wi-Fi parameter of the master device, a slave device can automatically learn a new Wi-Fi parameter through a UPNP channel between the slave device and the master device. It should be noted that an SSID is a network identifier and is used to distinguish different networks.

Figure 2:
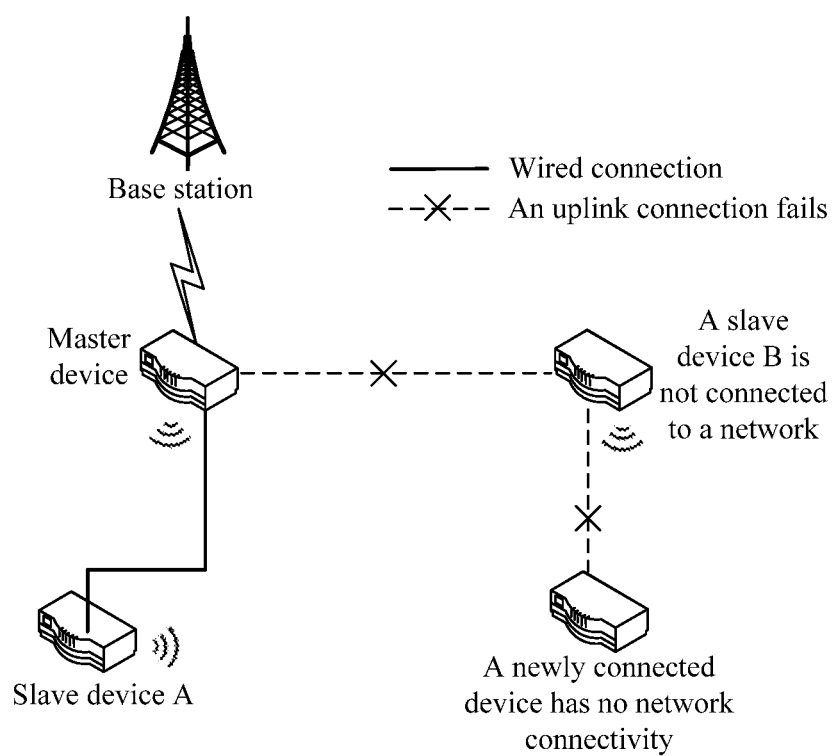
FIG. 2 is a schematic diagram of connecting a device to a network in the prior art.

In the prior art, if there is an abnormal device in the network, it cannot be ensured that a newly connected slave device can automatically connect to an uplink reaching the master device, and the newly connected device may have no network connectivity. As shown in FIG. 2, a slave device A is connected to a master device, and the slave device A has network connectivity. A slave device B is disconnected from the master device, and the slave device B has no network connectivity. Because an SSID and a password of the slave device A are the same as those of the slave device B, a newly connected slave device C may connect to the slave device B, and consequently the newly connected slave device C has no network connectivity.

Figure 3:
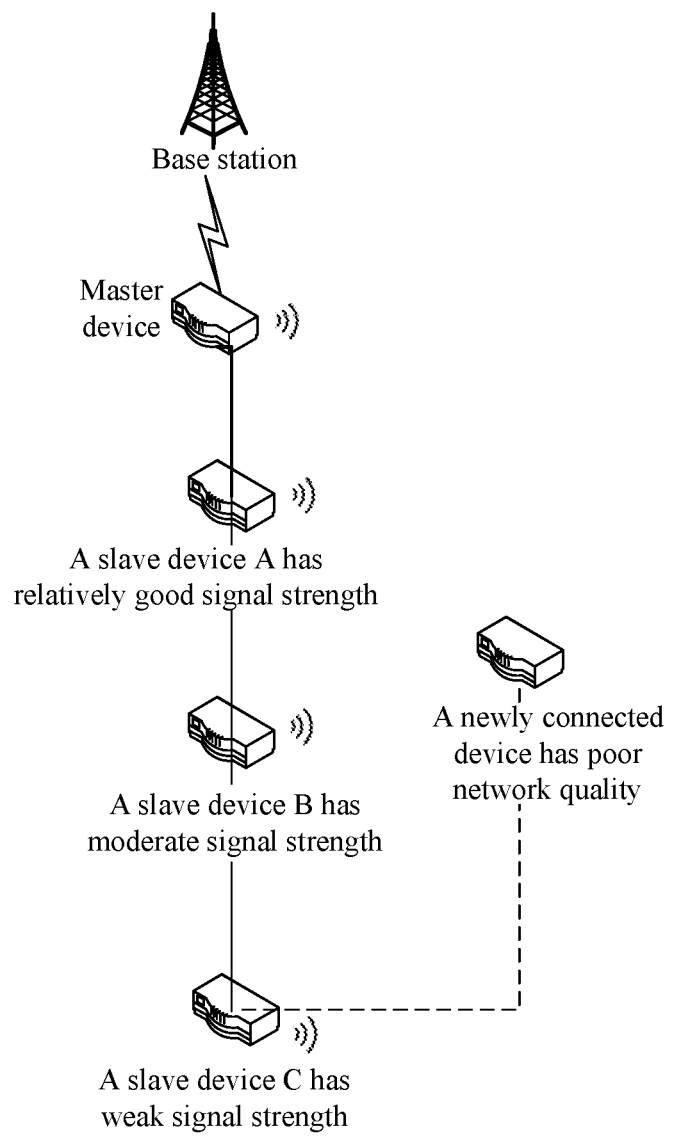
FIG. 3 is another schematic diagram of connecting a device to a network in the prior art.

A user may use a wired manner to make a newly-added device cascaded to a master device or a slave device in a network, and a specific networking mode is determined by the user. Referring to FIG. 3, if a newly-added device is cascaded to a master device or a slave device in a network in a wireless manner, the newly-added device may be cascaded to a slave device with relatively poor link quality and a relatively weak signal, and consequently the newly-added device has a poor network quality.

Figure 4:
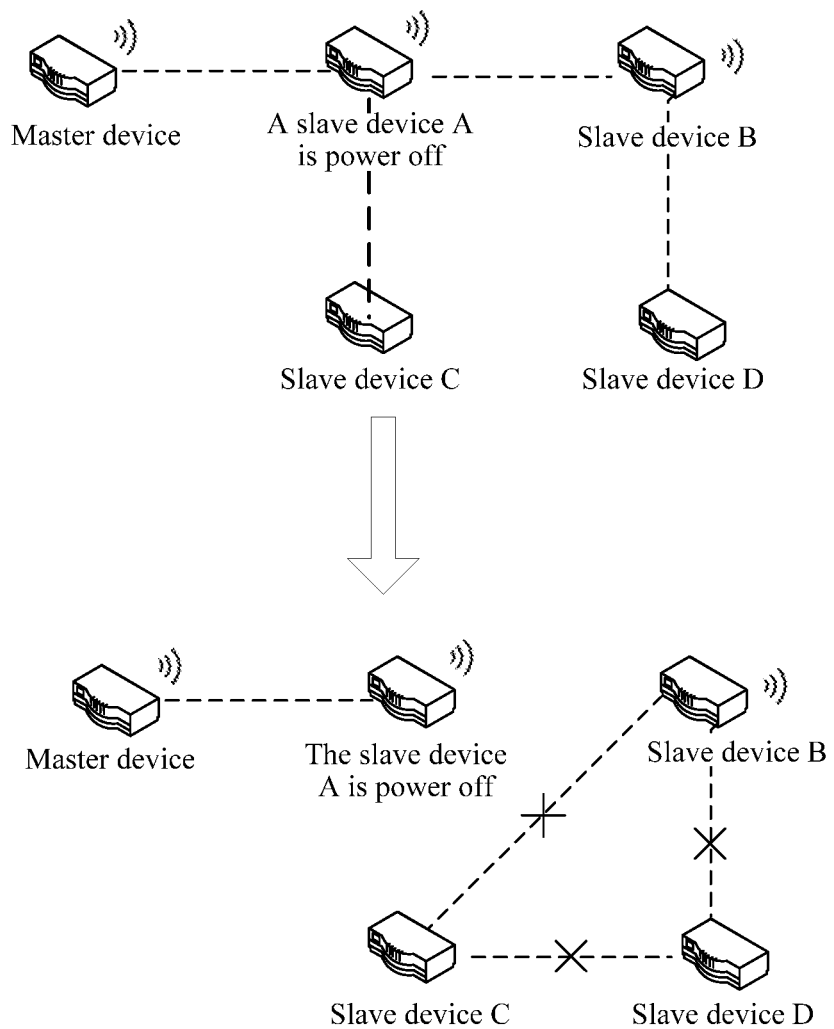
FIG. 4 is another schematic diagram of connecting a device to a network in the prior art.

In some wireless network scenarios, if an intermediate device is disconnected from a network, a downstream device cannot restore quickly. As shown in FIG. 4, after a slave device A is power off, a slave device B, a slave device C, and a slave device D may connect to each other instead of connecting to a master device, and consequently the slave device B, the slave device C, and the slave device D have no network connectivity.

In summary, in the prior art, when a device is connected to a current network for the first time or reconnected to the current network after disconnection, the device may be connected to a slave device disconnected from a master device, or connected to a slave device with very weak Wi-Fi signal strength. As a result, the device has no network connectivity, and has no connectivity to a base station.

In the solutions provided in the embodiments of the present invention, at least two routing devices (including a master device and at least one slave device) in a current network may broadcast networking message, where the networking message includes link quality of the device and a connectivity state between the device and the master device. A connectivity state in a networking message broadcast by the master device is connected by default. A device to be connected to the network scans networking messages broadcast by routing devices in the network, and determines, based on link quality and a connectivity state in a networking message broadcast by each routing device and signal strength of each device scanned by the routing device to be connected to the network, a device that has connectivity to the master device and that has best network quality. In this way, the to-be-connected device can connect to the device with the best network quality. Therefore, every level of routing device in the network can independently select an optimal link reaching the master device, to connect to the master device, avoiding a case in which a connected routing device has no network connectivity. This can satisfy that a terminal device can obtain best Internet accessing experience by connecting to any level of routing device in the network.

Figure 5:
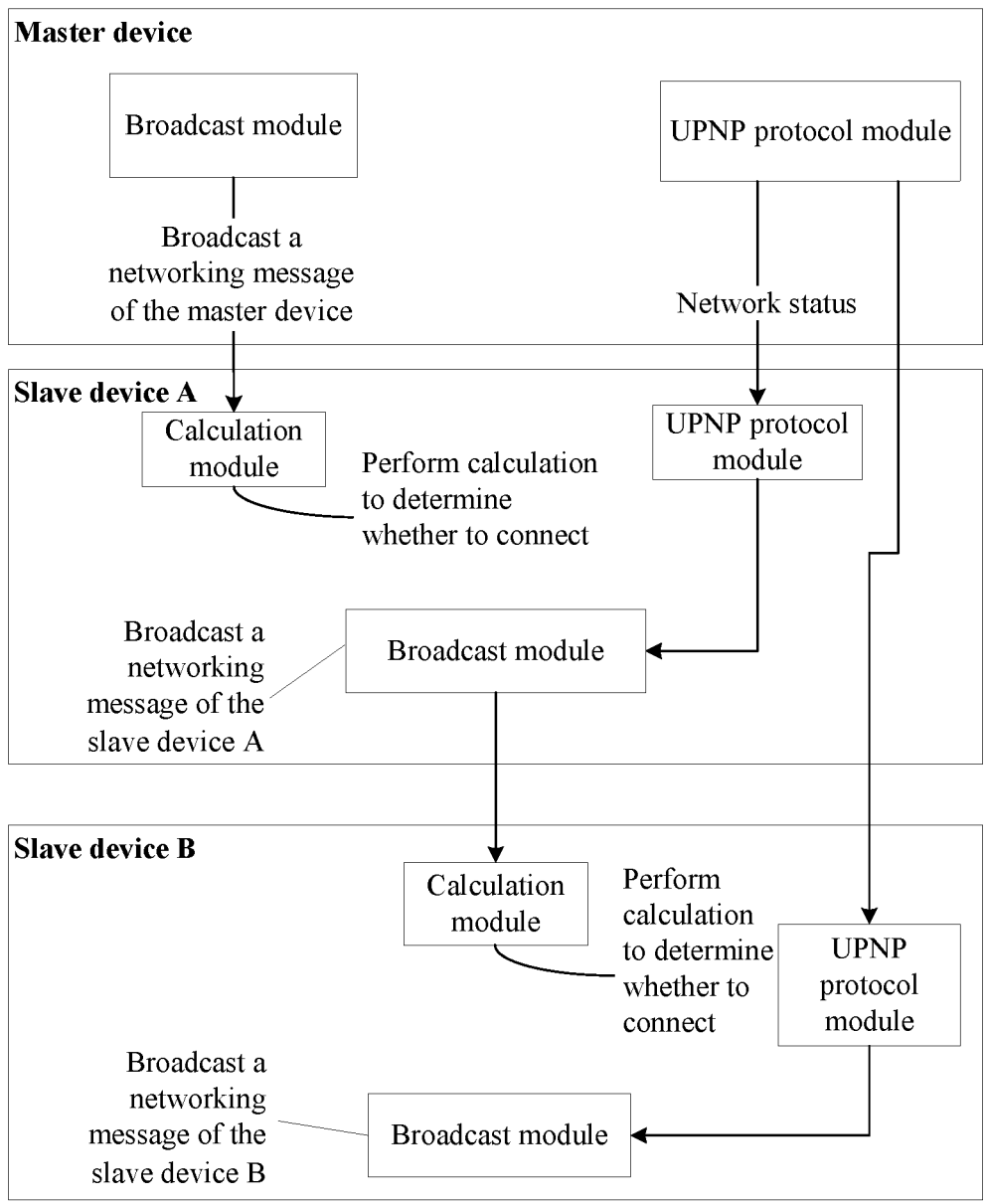
FIG. 5 is a schematic frame diagram of a multi-level networking system according to an embodiment of the present invention.

An embodiment of the present invention provides a network system, where the network system may be referred to as a multi-level networking system. As shown in FIG. 5, the multi-level networking system includes at least two routing devices, where the at least two routing devices include a master device and at least one slave device. The master device includes a broadcast module and a UPNP protocol module; the slave device includes a broadcast module, a calculation module, and a UPNP protocol module.

Specifically, the UPNP protocol modules of the master device and the slave device both support a UPNP protocol. After the slave device is connected to a network and obtains an IP address, the slave device detects, through the UPNP protocol module, whether a master device supporting the network exists on an uplink. If the UPNP protocol module of the slave device detects that a master device supporting the network exists on the uplink, the slave device sends an online message to the master device through the UPNP protocol module, to initiate an online operation. After the UPNP protocol module of the master device receives the online message, the master device completes synchronization of a Wi-Fi parameter. In addition, the master routing device may maintain a management channel between the UPNP protocol module of the master device and the UPNP protocol module of the slave device. A user may control the slave device through the management channel. After a Wi-Fi parameter of the master device is changed, the slave device may learn the Wi-Fi parameter through this management channel.

In addition, the broadcast modules of the master device and the slave device (for example, the master device and the slave device in FIG. 1, where the master device and the slave device in FIG. 1 in the embodiments of the present invention may be referred to as routing devices) may broadcast first messages. The first message may include a connectivity state and link quality. In one embodiment, the first message may further include a startup state and a device type. The connectivity state is used to indicate a connectivity state between the routing device and the master device, and the connectivity state may include connected or disconnected. For the slave device, the connectivity state indicates whether a network between the slave device and the master device is connected; for the master device, a connectivity state broadcast by the master device may be connected by default. The link quality is used to indicate link quality of the routing device. The startup state is used to indicate whether the routing device is started within preset duration. The device type is used to indicate whether the routing device is a master device or a slave device. The master device is directly connected to a network side (Internet), the slave device is directly or indirectly connected to the master device, and the slave device is connected to the network side by using the master device. For example, if a device A is connected to the master device and a device B is connected to the device A, it may be considered that the device B is indirectly connected to the master device.

Referring to FIG. 5, when a new device is connected to the multi-level networking system, a calculation module of the new device (that is, a to-be-connected device described in this embodiment of the present invention) scans first messages broadcast by routing devices (for example, the master device or the slave device in FIG. 5), and obtains currently found signal strength of each routing device, and then finds, based on a scanned networking message and the found signal strength, a device that is suitable to be connected, and connects to the device, so as to connect to the multi-level networking system.

It should be noted that the first message in this embodiment of the present invention is a message for establishing a network, and is equivalent to the networking message described in this embodiment of the present invention.

In addition, after the network is formed, the master device may further dynamically adjust a networking structure. Specifically, for a device A in the network, assuming that the device A is currently connected to the device B, the master device calculates effective link quality between the device A and another device in the network. If it is discovered that effective link quality between the device A and a device C is better than effective link quality between the device A and the device B, the master device sends a network status message to the device A through a UPNP channel between the master device and the device A, to instruct the device A to disconnect from the device B and connect to the device C.

It should be noted that the routing device and the to-be-connected device in this embodiment of the present invention are devices that can send a data packet to a destination through networks, that is, devices that support routing, for example, a wired or wireless router and a power line communication (PLC for short) device with a routing function.

Figure 6:
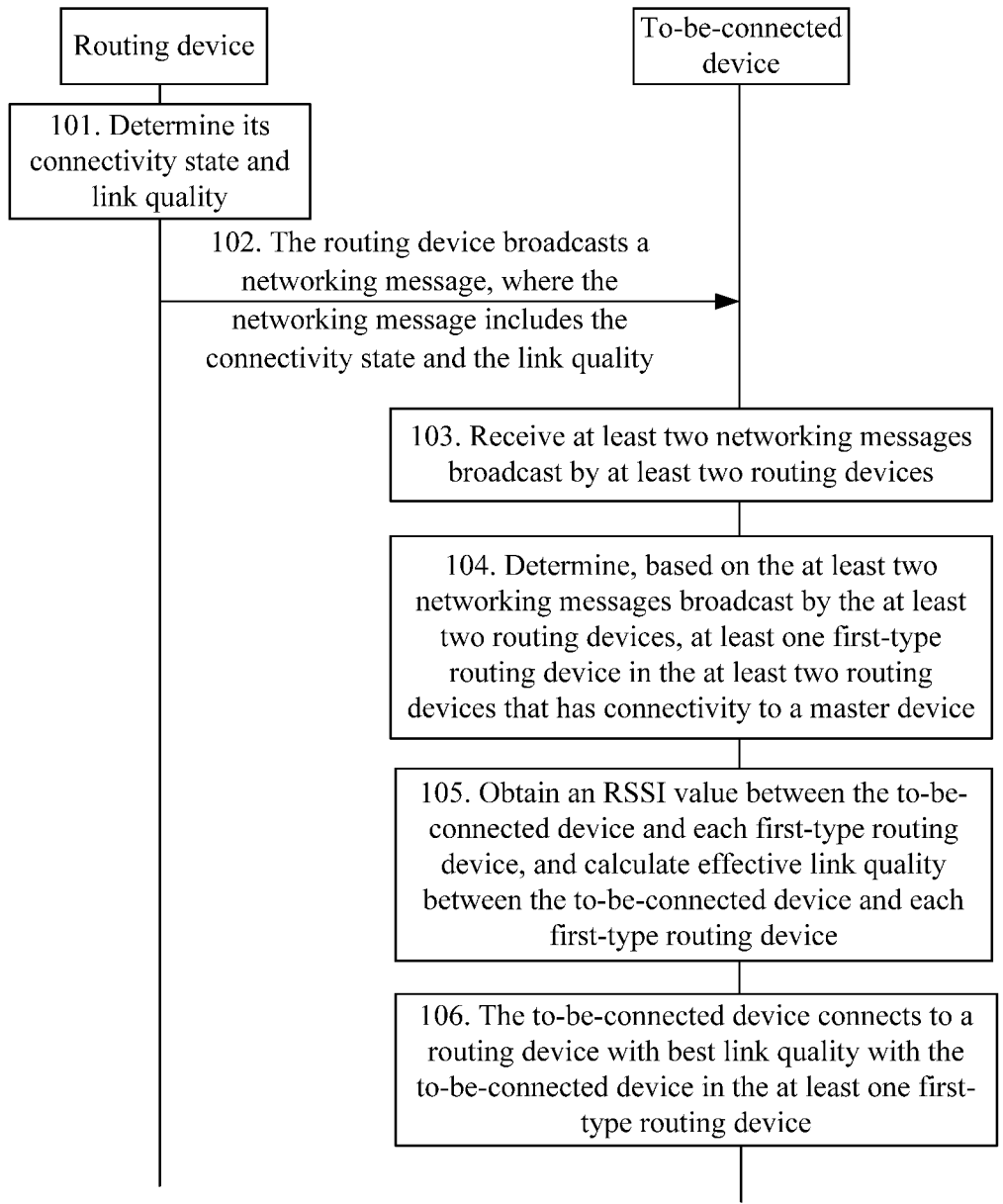
FIG. 6 is a schematic flowchart of a network connection method according to an embodiment of the present invention.

An embodiment of the present invention provides a network connection method, where the method may be applied to a distributed network, and more specifically, may be applied to the multi-level networking system shown in FIG. 1 or FIG. 5. As shown in FIG. 6, the method includes the following operations:

Operation 101: A routing device determines its connectivity state and link quality.

A connectivity state between the routing device and a master device may be "connected". In other words, it is considered that the routing device has connectivity to the master device, that is, it may be considered that a network between the routing device and the master device is connected. A connectivity state between the routing device and the master device in the network may be "disconnected". In other words, it is considered that the routing device has no connectivity to the master device, that is, it may be considered that a path (wired or wireless) between the routing device and the master device is not connected, that is, disconnected.

Link quality is used to indicate link quality of the routing device. The link quality represents a link capability of the routing device to some extent, for example, signal strength of a sub-network provided by the routing device. For example, a value may be used to indicate the link quality of the routing device. Certainly, it may be considered that a routing device with good link quality has a relatively strong link capability, and provides a stronger signal of a sub-network. A user terminal can obtain better Internet accessing experience by connecting to the sub-network.

In some embodiments, the routing device may further determine its startup state, where the startup state is used to indicate whether the routing device is started within preset duration. In this embodiment of the present invention, the preset duration is a time window before a current moment, and an end moment of the window time is the current moment. The current moment is a moment at which the routing device performs operation 101 to determine the startup state. For example, the "startup state" may indicate whether the routing device is just started within the first five minutes. It may be considered that if the routing device is just started, link quality is still unstable, and the link quality becomes stable only after specific duration.

In some embodiments, the routing device may further determine its device type, where the device type is used to indicate whether the routing device is a master device or a slave device.

In specific implementation, fields may be used to indicate the connectivity state, the link quality, the startup state, and the device type. Table 1 shows a possible implementation of the connectivity state, the link quality, the startup state, and the device type.

TABLE 1

| Field name | Description | Allowable value |
| --- | --- | --- |
| IsConnectOK | Whether the device has connectivity to a master device? | 0: The device has no connectivity to a master device.<br>1: The device has connectivity to a master device. |
| LinkQuality | Link quality of the device | −100 to 0 dBm |
| RebootBit | Started within preset duration? | 0: Started within the duration<br>1: Not started within the preset duration |
| Mode | Whether the device is a slave device or a master device? | 0x00: The device is not a device in a current network.<br>0x01: Master device<br>0x02: Slave device |

Referring to Table 1, the "IsConnectOK" field indicates the "connectivity state" in this embodiment of the present invention, the "LinkQuality" field indicates the "link quality" in this embodiment of the present invention, the "RebootBit" field indicates the startup state in this embodiment of the present invention, and "Mode" indicates the device type in this embodiment of the present invention. An "IsConnectOK" field of the master device is 1 by default. It should be noted that values of the fields are not limited to the values listed in Table 1, and may be other values, provided that the other values can represent meanings indicated by the fields. This is not limited in this embodiment of the present invention.

Operation 102: The routing device broadcasts a networking message, where the networking message includes the connectivity state and the link quality.

In specific implementation, the routing device may extend a service set identifier (SSID), fill each field determined in operation 101 into an extended field of the SSID, and broadcast the SSID through a broadcast module. In addition, an information element (IE) field may be used to identify the extended SSID. In other words, the networking message in this embodiment of the present invention may be the foregoing SSID. Further, the fields in the networking message are the connectivity state, the link quality, the startup state, and the device type successively.

In some embodiments, the networking message may further include the device type and used to notify the outside whether the device itself is a slave device or a master device. The networking message may further include the startup state and used to notify the outside whether the device is just started.

With reference to examples in Table 1, in an example in which "IsConnectOK"=1, "LinkQuality"=−40, "RebootBit"=1, and "Mode"=0x02, field values in the networking message broadcast by the routing device are listed in Table 2 below.

TABLE 2

| IsConnectOK | LinkQuality | | | | RebootBit | Mode |
| --- | --- | --- | --- | --- | --- | --- |
| 1 | 0x28 | 0x00 | 0x00 | 0x00 | 1 | 0x02 |

It should be noted that for "LinkQuality" in Table 2, 0x28 indicates link quality, and the remaining fields are padding fields; or "LinkQuality" may not include a padding field, and this is not limited herein.

Operation 103: A to-be-connected device receives at least two networking messages broadcast by at least two routing devices.

It should be noted that for "LinkQuality" in Table 2, 0x28 indicates link quality, and the remaining fields are padding fields; or "LinkQuality" may not include a padding field, and this is not limited herein.

Operation 103: The to-be-connected device receives at least two networking messages broadcast by at least two routing devices.

In specific implementation, a calculation module of the to-be-connected device scans SSIDs broadcast by routing devices, to obtain networking messages of the routing devices.

Operation 104: The to-be-connected device determines, based on the at least two networking messages broadcast by the at least two routing devices, at least one first-type routing device in the at least two routing devices that has connectivity to a master device.

In specific implementation, the to-be-connected device obtains a networking message broadcast by each routing device, and screens, based on a connectivity state of each routing device and based on a "connectivity state" in the networking message broadcast by each routing device, for example, an "IsConnectOK" field, a device that has connectivity to the master device. The device that has connectivity to the master device is the first-type routing device. The master device also belongs to a first-type routing device.

Operation 105: The to-be-connected device calculates and obtains an RSSI value between the to-be-connected device and each first-type routing device, and calculates effective link quality between the to-be-connected device and each first-type routing device.

In specific implementation, when the to-be-connected device obtains, by scanning, a wireless signal of the routing device, for example, a Wi-Fi signal, the to-be-connected device may correspondingly measure a received signal strength indicator (RSSI) corresponding to each routing device, that is, a signal strength value between the to-be-connected device and the routing device that broadcasts the networking message. Therefore, the to-be-connected device may obtain the RSSI value corresponding to each first-type routing device.

Further, for each first-type networking device, the to-be-connected device may obtain the effective link quality between the to-be-connected device and the first-type routing device based on link quality of each first-type routing device and the RSSI value corresponding to each first-type routing device. For example, the effective link quality between the to-be-connected device and the first-type routing device=the link quality of the first-type routing device+the RSSI value corresponding to the first-type device/n. n is a value greater than 1, and the value of n depends on a wireless chip of the to-be-connected device (for example, a Wi-Fi chip). If the chip disposed in the to-be-connected device changes, the value of n changes.

The following uses n=2 as an example to describe in detail how the to-be-connected device calculates the effective link quality between the to-be-connected device and each first-type routing device.

For example, first-type routing devices determined by the to-be-connected device in operation 104 is a routing device A, a routing device B, and a routing device C. Link quality indicated by a "link quality field" in a networking message broadcast by the routing device A to the outside is −80 dBm, link quality indicated by a "link quality field" in a networking message broadcast by the routing device B to the outside is −60 dBm, and link quality indicated by a "link quality field" in a networking message broadcast by the routing device C to the outside is −40 dBm. In addition, RSSI values corresponding to the routing device A, the routing device B, and the routing device C are −20 dBm, −40 dBm, and −60 dBm, respectively.

According to the foregoing calculation method, effective link quality between the to-be-connected device and the routing device A is −80+(−20/2)=−90 dBm;

effective link quality between the to-be-connected device and the routing device B is −60+(−40/2)=−80 dBm; and effective link quality between the to-be-connected device and the routing device C is −40+(−60/2)=−70 dBm.

Operation 106. The to-be-connected device connects to a routing device with best effective link quality with the to-be-connected device in the at least one first-type routing device.

In other words, the to-be-connected device connects to a network provided by the routing device with the best effective link quality with the to-be-connected device, and joins the current network as a downstream device of the routing device with the best effective link quality with the to-be-connected device. For example, the effective link quality between the to-be-connected device and the routing device A, the effective link quality between the to-be-connected device and the routing device B, and the effective link quality between the to-be-connected device and the routing device C are −90 dBm, −80 dBm, and −70 dBm, respectively. Because −70 dBm>−80 dBm>−90 dBm, the effective link quality between the to-be-connected device and the routing device C is the best. Therefore, the to-be-connected device connects to the routing device C.

In specific implementation, a networking message broadcast by a routing device carries a media access control (MAC) address of the device. Therefore, after calculating best effective link quality based on link quality in a networking message, the to-be-connected device may determine, based on a MAC address in the networking message, a device that sends the networking message.

Certainly, after successfully joining the current network, the to-be-connected device may alternatively broadcast a networking message to the outside, so that another to-be-connected device scans the networking message broadcast by the to-be-connected device, and determines, based on a connectivity state and link quality in the networking message broadcast by the to-be-connected device, whether to connect to the device.

In addition, after successfully joining the current network, the to-be-connected device may alternatively perform operations 103 to 106 again, that is, the device scans, based on a specific period, a networking message broadcast by another routing device, and calculates effective link quality between the to-be-connected device and each routing device. If it is discovered that link quality between the to-be-connected device and a device is better than link quality between the to-be-connected device and the routing device to which the to-be-connected device connects in operation 106, the to-be-connected device may connect to this newly discovered device.

Further, after successfully joining the current network, the to-be-connected device consecutively performs operations 103 to 106 M times. Only when it is discovered that link quality between the to-be-connected device and a device is better than link quality between the to-be-connected device and the routing device to which the to-be-connected device connects in operation 106, the to-be-connected device connects to this newly discovered device. M is an integer greater than 1.

In some embodiments, on a premise that a networking message broadcast by a routing device includes a startup state, if there is no routing device connected to the master device (for example, the first-type routing device) in the at least two routing devices, the to-be-connected device determines, based on startup states in the networking messages broadcast by the at least two routing devices, whether there is a second-type routing device that is started within preset duration in the at least two routing devices.

If there is the second-type routing device in the at least two routing devices, the to-be-connected device receives again, after waiting for specific duration, the networking messages broadcast by the at least two routing devices.

In other words, although a connectivity state in a networking message broadcast by a routing device indicates that the routing device has no connectivity to the master device, this may be caused by that the device is just started and has an unstable signal. Therefore, the to-be-connected device may perform operation 201 again after waiting for a period of time, to scan the SSID broadcast by the routing device.

The following describes solutions in which each device determines its connectivity state and link quality.

1. Solution for Determining a Connectivity State:

In some embodiments, a device (for example, the routing device in this embodiment of the present invention) may determine its connectivity state in the following manners, and details are as follows:

1. Receive a networking message broadcast by an upstream device, and use a connectivity state in the networking message broadcast by the upstream device as the connectivity state.

In specific implementation, if an IsConnectOK field in the networking message broadcast by the upstream device of the device is 0, an IsConnectOK field broadcast by the device to the outside may also be 0.

2. A device detects a connectivity state with a master device periodically, and determines the connectivity state based on a detection result.

It should be noted that the connectivity state between the device and the master device refers to whether the device has connectivity to the master device. The device may be directly or indirectly connected to the master device.

If the detection result is that the routing device is disconnected from the master device, that is, the device has no connectivity to the master device, it is determined that the connectivity state is a first value, where the first value is used to indicate that the routing device has no connectivity (including direct connectivity or indirect connectivity) to the master device. For example, a value of an IsConnectOK field in Table 1 is "0".

If the detection result is that the routing device is connected to the master device, that is, the device has connectivity to the master device, it is determined that the connectivity state is a second value, where the second value is used to indicate that the routing device has connectivity (including direct connectivity or indirect connectivity) to the master device. For example, a value of an IsConnectOK field in Table 1 is "1".

Specifically, the device may detect a connectivity state of an uplink every 500 ms through a repeater link, for example, the channel between the UPNP modules of the devices in FIG. 5, that is, the device attempts to connect to a network; if failing to connect to the network, the device perceives that the device is disconnected from the network, and immediately sets the IsConnectOK field to 0.

In addition, the device may alternatively determine, based on a quantity of network connection failures, whether a link is disconnected. After consecutive N failures, the device sets the IsConnectOK parameter to 0. When successfully connecting to the network, the device resets the IsConnectOK field to 1.

3. Determine the connectivity state based on reception of a heartbeat packet by using a heartbeat mechanism.

Specifically, a slave device (for example, the routing device in this embodiment of the present invention) sends a heartbeat packet to a master device in a network periodically, and if determining that the master device has received the heartbeat packet, the routing device determines that the connectivity state is a second value, where the second value is used to indicate that the routing device has connectivity to the master device; and if determining that none of heartbeat packets consecutively sent N times is received by the master device, the routing device determines that the connectivity state is a first value, where the first value is used to indicate that the routing device has no connectivity to the master device; and N is an integer greater than 1.

Usually, the device can monitor its network status in time by using the heartbeat mechanism. The "heartbeat mechanism" means: A slave device sends its heartbeat packet to a master device in a network periodically; if the slave device that sends the heartbeat packet does not receive, at a predetermined moment, a reply sent by the master device in the network, for example, "an ok message", it indicates that the master device does not receive the heartbeat packet sent by the slave device; and in this case, it can be determined that a system fault occurs on the slave device.

Figure 7:
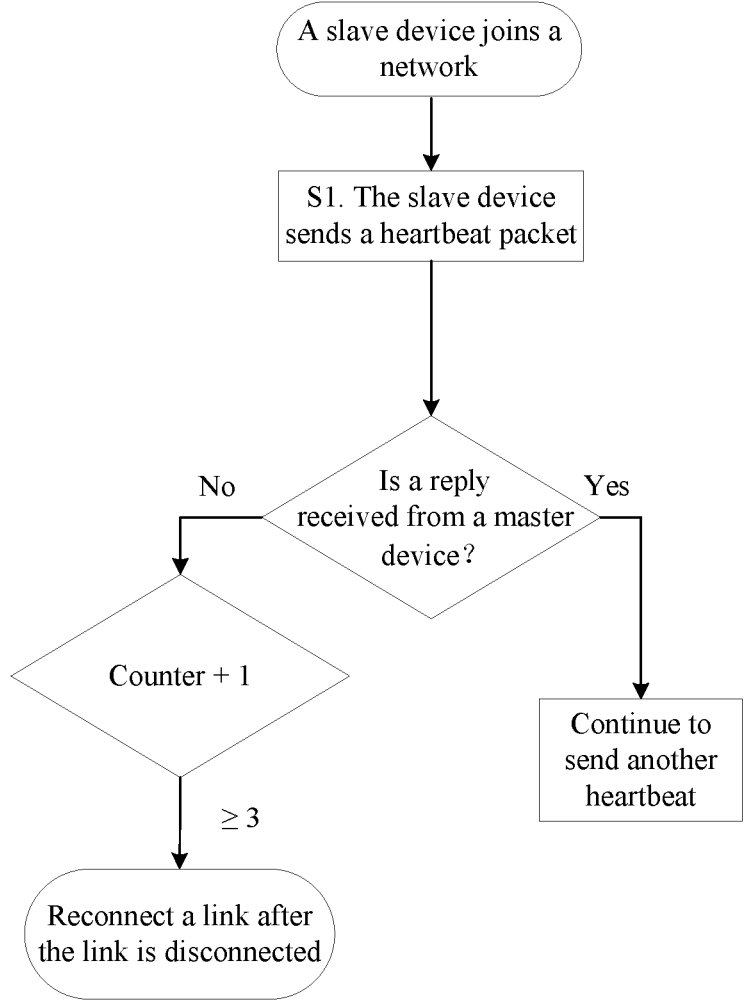
FIG. 7 is a schematic flowchart of a method for determining a connectivity state according to a heartbeat mechanism according to an embodiment of the present invention.

For example, the method for determining the connectivity state based on the heartbeat mechanism provided in this embodiment of the present invention, as shown in FIG. 7, specifically includes the following operations:

S1. After a network is successfully established, a slave device starts to send a heartbeat packet to a master device.

In specific implementation, a heartbeat period may be 10 seconds, that is, the slave device sends one heartbeat packet to the master device every 10 seconds. The heartbeat packet may be used to indicate a current system status of the slave device, for example, link quality of the slave device.

S2. The slave device determines whether the heartbeat packet is successfully received by the master device, that is, whether the slave device receives a reply from the master device.

If receiving the reply from the master device, the slave device determines that the heartbeat packet is successfully received by the master device, and then performs operation S3, that is, continuing to send another heartbeat, and sending a heartbeat packet at a specific moment.

If no reply is received from the master device, the slave device determines that the heartbeat packet is not successfully received by the master device, and then performs operation S4.

S3. The slave device continues to send another heartbeat packet to the master device.

It should be noted that an IsConnectOK field may alternatively be set to 1.

S4. The slave device increments a counter by 1 and monitors a value of the counter. When the value of the counter is greater than 3, the slave device performs S5.

In specific implementation, an initial value of the counter may be set to 0.

S5. The slave device determines that the slave device is disconnected from the master device.

If N=3, that is, none of heartbeat packets consecutively sent by the slave device three times is not successfully received by the master device, it may be considered that the slave device is disconnected from the master device, and the slave device may set the IsConnectOK field to 0.

It should be noted that, in operation S5, after the slave device determines that the slave device is disconnected from the master device, the slave device may further attempt to reconnect to the master device according to a reconnection period. The reconnection period satisfies the following calculation formula:

Reconnection period=$(t\times3)\times(2^m)$ where t is a heartbeat period, that is, a period of sending a heartbeat packet by the slave device; and m is the quantity of reconnections. For example, when m=1, the reconnection period is $(t\times3)\times(2^1)$ that is, after performing operation S5, the slave device makes a first attempt to reconnect to the master device after $(t\times3)\times(2^1)$ s; when m=2, the reconnection period is $(t\times3)\times(2^2)$, that is, after performing operation S5, the slave device makes a second attempt to reconnect to the master device after $(t\times3)\times(2^2)$ s. By this analogy, the slave device may determine a time of each reconnection.

After the slave device reestablishes a connection to the master device through reconnection, if a heartbeat packet sent again by the slave device is successfully received by the master device, the counter is cleared.

In summary, according to the foregoing heartbeat mechanism, if a heartbeat failure occurs (that is, occurs consecutive N times), the IsConnectOK field is immediately set to 0, and after a heartbeat returns to normal, the IsConnectOK field is reset to 1.

2. Solution for Determining Link Quality:

In some embodiments, a routing device may determine its link quality based on link quality of an upstream device and a received signal strength indicator RSSI value between the routing device and the upstream device. Specifically, if the link quality of the upstream device is less than the RSSI value between the routing device and the upstream device, it is determined that the link quality is a sum of the link quality of the upstream device and a link attenuation value, where the link attenuation value is a signal attenuation quantity on a link between the routing device and the upstream device; or if the RSSI value between the routing device and the upstream device is less than the link quality of the upstream device, it is determined that the link quality is a sum of the RSSI value and a link attenuation value.

It should be noted that an RSSI is used to indicate signal strength between devices. Due to factors such as a distance and an obstacle between devices, an RSSI value between the devices is attenuated, and is usually a value less than 0. If the link between the routing device and the upstream device is a wired link, it may be considered that signal strength between the upstream device and a downstream device is not attenuated, and the RSSI value between the routing device and the upstream device is 0 by default. If the link between the routing device and the upstream device is a wireless link, when the routing device scans a signal broadcast by the upstream device (for example, a Wi-Fi signal), the RSSI value between the routing device and the upstream device may be measured and the value may be a value less than 0.

Figure 8:
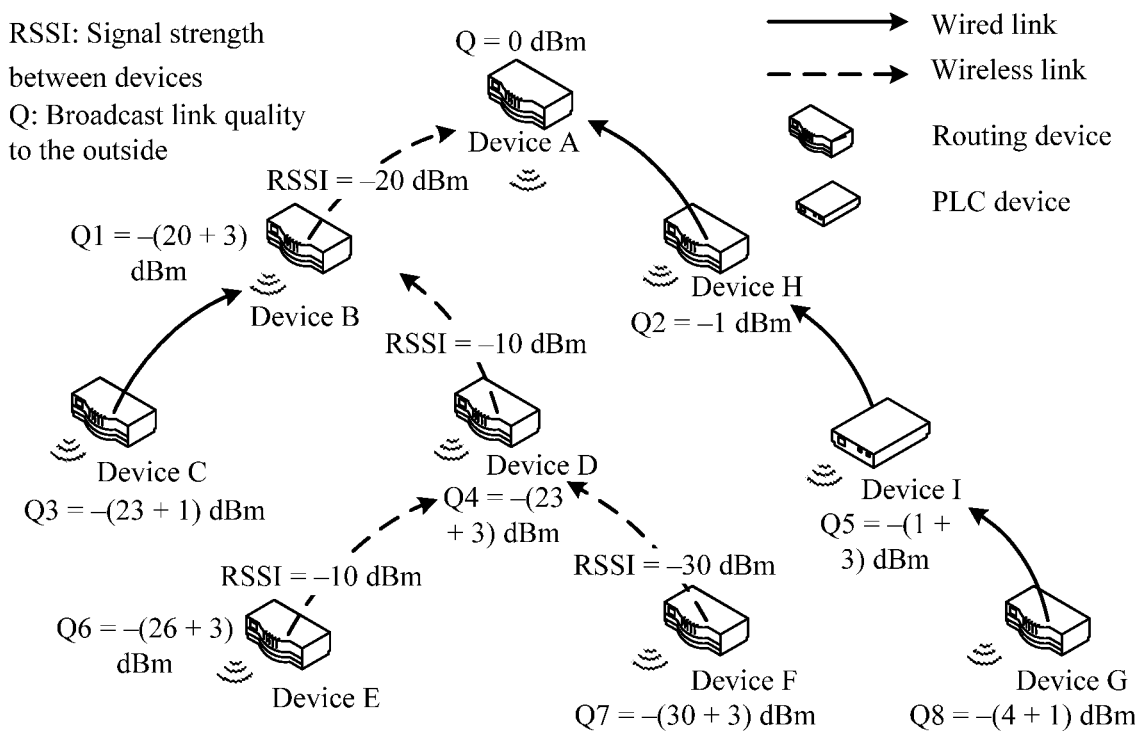
FIG. 8 is a schematic diagram of a link quality calculation method according to an embodiment of the present invention.

With reference to FIG. 8, the following describes in detail how to calculate link quality of a routing device. Referring to FIG. 8, if a connection between devices is a wired connection, a link attenuation value is −1 dBm; or if a connection between devices is a wireless connection, a link attenuation value is −3 dBm. In addition, when a downstream device is a PLC device, the downstream device is connected to an upstream device through a power line, and a link attenuation value is −3 dBm.

For example, it may be considered that there is no attenuation when a signal on a network side is transmitted to a master router. Signal energy at the master device is 1 mw, and a unit of link quality is generally dBm. Therefore, 1 mw of the signal energy at the master device is converted to 0 dBm of the link quality, that is, 1 mw=0 dBm. Referring to FIG. 8, it can be understood that as a signal propagates, energy is gradually weakened due to impact of an obstacle and a distance. In this case, link quality at a receiving end is generally a negative value, and the link quality closer to 0 indicates better link quality. In a network shown in FIG. 8, a device A is a master device, while the other devices B to G are slave devices. A device I is a PLC device with a routing function, while the other devices are wired or wireless routers.

Link quality broadcast by the device A to the outside is 0.

A link between the device B and the device A is a wireless link. The device B measures an RSSI value between the device B and the device A. For example, the RSSI value between the device B and the device A is −20 dBm. For the device B, an upstream device is the device A, and the link quality of the device A is 0. Further, because −20<0, and the link attenuation value corresponding to the wireless link is −3 dBm, link quality of the device B=(−20)+(−3)=−23 dBm.

A link between a device C and the device B is a wired link, and therefore an RSSI value between the device C and the device B is 0. For the device C, an upstream device is the device B, and the link quality of the device B is −23 dBm. Further, because −23<0, and the link attenuation value corresponding to the wired link is −1 dBm, link quality of the device C=(−23)+(−1)=−24 dBm.

A link between a device D and the device B is a wireless link, and the device D measures an RSSI value between the device D and the device B. For example, the RSSI value=−10 dBm. For the device D, an upstream device is the device B, and the link quality of the device B is −23 dBm. Further, because −23<−10, and the link attenuation value corresponding to the wireless link is −3 dBm, link quality of the device D=(−23)+(−3)=−26 dBm.

A link between a device E and the device D is a wireless link, and the device E measures an RSSI value between the device D and the device E. For example, the RSSI value=−10 dBm. For the device E, an upstream device is the device D, and the link quality of the device D is −26 dBm. Further, because −26<−10, and the link attenuation value corresponding to the wireless link is −3 dBm, link quality of the device E=(−26)+(−3)=−29 dBm.

Similarly, a link between a device F and the device D is a wireless link, and the device F measures an RSSI value between the device F and the device D. For example, the RSSI value=−30 dBm. For the device F, an upstream device is the device D, and the link quality of the device D is −26 dBm. Further, because −30<−26, and the link attenuation value corresponding to the wireless link is −3 dBm, link quality of the device F=(−30)+(−3)=−33 dBm.

A link between a device H and the device A is a wired link, and therefore an RSSI value between the device H and the device A is 0. For the device H, an upstream device is the device A, and the link quality of the device A is 0 dBm. Further, because the link attenuation value corresponding to the wired link is −1 dBm, link quality of the device H=0+(−1)=−1 dBm.

A link between a device I and the device H is a wired link, and therefore an RSSI value between the device I and device H is 0. For the device I, an upstream device is the device H, and the link quality of the device H is −1 dBm. Further, because −1<0, the device I is a PLC, and the link attenuation value between the device I and the upstream device is −3 dBm, the link quality of the device F is (−1)+(−3)=−4 dBm.

A link between a device G and the device I is a wired link, and therefore an RSSI value between the device G and the device I is 0. For the device G, an upstream device is the device I, and link quality of the device I is −4 dBm. Further, because −4<0, the link attenuation value corresponding to the wired link is −1 dBm, the link quality of the device F=(−4)+(−1)=−5 dBm.

It should be noted that, in a hybrid networking scenario, after a master device knows a topological structure of an entire network, the master device can learn link information of each slave device in the network topology. If a downstream device does not learn link information of an upstream device, for example, if there is a wired connection between the upstream device and the downstream device, the downstream device does not know link quality of the upstream device, the master device may send, to the slave device through a management channel between the master device and the slave device (that is, a channel between UPNP protocol modules), link information of the upstream device of the slave device, for example, the link quality of the upstream device of the slave device. Usually, the master device needs to send link quality of an upstream device of a slave device in a wired connection to the slave device, or the master device directly sends link quality of a slave device in a wired connection to the slave device. In this way, each slave device can obtain link quality of an upstream device. In addition, a downstream device may also receive a networking message broadcast by an upstream device, and obtain link quality of the upstream device based on "link quality" in the networking message.

Figure 9:
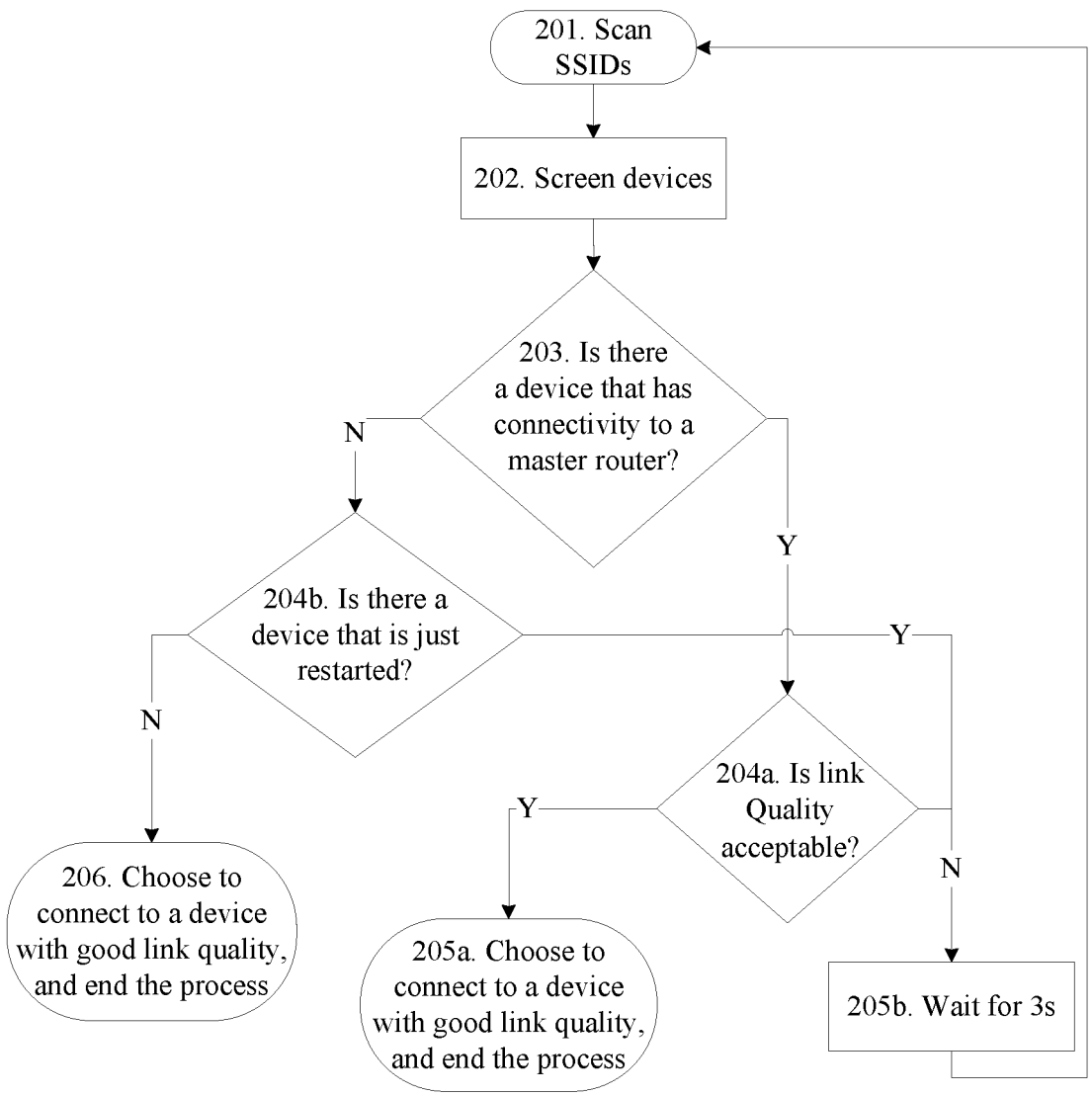
FIG. 9 is another schematic flowchart of a network connection method according to an embodiment of the present invention.

An embodiment of the present invention further provides a network connection method, where the network connection method is performed by a to-be-connected device. As shown in FIG. 9, the method includes the following operations:

Operation 201: The to-be-connected device scans SSIDs broadcast by routing devices.

It should be noted that the SSIDs broadcast by routing device include two specific fields, for example, an IsConnectOK field and a LinkQuality field. In one embodiment, the SSIDs broadcast by routing devices may further include a RebootBit field and a Mode field, and these fields are used to indicate a connectivity state, link quality, a startup state, and a device type of the routing device, respectively.

Operation 202: The to-be-connected device screening the routing device.

Specifically, the to-be-connected device may screen the routing devices by using some fields in the SSID, for example, using an IE field in the SSID. The IE field is an identifier of an extended SSID. If the SSID broadcast by the routing device does not include the IE field, it indicates that the SSID is not extended, and information such as the connectivity state, the startup state, and the link quality of the routing device is not included. In this case, the SSID broadcast by the routing device is not to be processed. If the SSID broadcast by the routing device includes the IE field, it indicates that the SSID is extended, and the extended field includes information such as the connectivity state, the startup state, and the link quality of the routing device. In this case, operation 203 is performed for further screening on the SSID of the routing device on which screening is performed in operation 202.

It should be noted that operation 202 is an optional operation, and the to-be-connected device may alternatively directly perform operation 203 after performing operation 201.

Operation 203: The to-be-connected device determines whether there is a routing device that has connectivity to a master device.

Specifically, if there is a routing device that has connectivity to the master device in a routing device that remains after the screening performed in operation 202, operation 204a is performed. If there is no routing device that has connectivity to the master device in a routing device that remains after the screening performed in operation 202, operation 204b is performed.

In specific implementation, the connectivity state of each routing device, that is, whether the routing device has connectivity to the master device, may be determined by using the IsConnectOK field in the SSID broadcast by the routing device. For example, the IsConnectOK field is 1, that is, the connectivity state between the routing device that broadcasts the SSID and the master device is "has connectivity to the master device". If the IsConnectOK field in the SSID is 0, the connectivity state between the routing device that broadcasts the SSID and the master device is "has no connectivity to the master device". "1" may be regarded as the first value in the embodiments of the present invention, and "0" may be regarded as the second value in the embodiments of the present invention.

Operation 204a: The to-be-connected device determines whether link quality of the routing device is within an acceptable range.

In specific implementation, the "acceptable range" may be "greater than −50 dBm". In other words, the to-be-connected device determines whether there is a routing device with link quality greater than −50 dBm in the routing device that has connectivity to the master device. If there is a routing device with link quality greater than −50 dBm in the routing device that has connectivity to the master device, operation 205a is performed. Otherwise, operation 205b is performed.

It should be noted that link quality of each routing device may be determined by using a LinkQuality field in the SSID broadcast by the routing device. For example, the LinkQuality field is 0x28, that is, the link quality of the routing device that broadcasts the SSID is −40 dBm.

Operation 205a: The to-be-connected device chooses to connect to a routing device with best effective link quality with the to-be-connected device.

To be specific, the to-be-connected device calculates effective link quality with each routing device that has connectivity to the master device and that has link quality greater than −50 dBm, and chooses to connect to a device with best effective link quality with the to-be-connected device.

In specific implementation, for each routing device that has connectivity to the master device and that has link quality greater than −50 dBm, the effective link quality between the to-be-connected device and the device is calculated based on link quality in a networking message broadcast by the device and an RSSI value between the to-be-connected device and the device. Specifically, the effective link quality between the to-be-connected device and the device=the link quality indicated by the networking message broadcast by the device+the RSSI value between the to-be-connected device and the device/n. A limitation on n has been provided in the embodiments of the present invention, and details are not described herein again.

It should be noted that if a link between the to-be-connected device and the device is a wired link, the RSSI value between the to-be-connected device and the device is zero by default; or if a link between the to-be-connected device and the device is a wireless link, the to-be-connected device may measure the RSSI value between the to-be-connected device and the device when obtaining a wireless signal of the device by scanning, and the RSSI value is usually a negative value. In addition, a link attenuation value is a signal attenuation quantity on the link between the to-be-connected device and the device.

Certainly, after successfully joining a current network, the to-be-connected device may alternatively broadcast a networking message to the outside. Assuming that a device to which the to-be-connected device finally connects is a device A, a LinkQuality field in a networking message subsequently broadcast by the to-be-connected device may be determined based on effective link quality between the to-be-connected device and the device A.

Operation 205b: The to-be-connected device performs operation 201 again after waiting for 3 s.

It should be noted that "3 s" is a possible implementation of this embodiment of the present invention. Duration that the to-be-connected device waits for in operation 205b is not limited to only 3 s, and may be other duration. This is not limited in this embodiment of the present invention.

In other words, if link quality of a routing device currently scanned by the to-be-connected device is not ideal, the to-be-connected device may perform operation 201 again after waiting for a period of time, to scan the SSID broadcast by the routing device.

In some embodiments, if the to-be-connected device waits for an excessively long time in operation 205b, for example, more than 3 s, the to-be-connected device may choose to connect to a routing device with best link quality in a "routing device that has connectivity to the master device and that has link quality less than −50 dBm".

Operation 204b: The to-be-connected device determines whether there is a routing device that is just started in the routing devices.

It should be noted that "just started" may be considered as that a routing device is started within preset duration before operation 201, for example, started within five minutes before operation 201. In some embodiments, a moment at which operation 201 is performed is the $x^{th}$ minute, and whether there is a routing device that is started within the $(x-5)^{th}$ minute to the $x^{th}$ minute in a "routing device that has no connectivity to the master device" is determined herein.

If it is determined that there is a routing device that is just started in the routing devices, operation 205b is performed, and operation 203 is performed again after 3s. In other words, although the IsConnectOK field in the SSID broadcast by the routing device indicates that the routing device has no connectivity to the master device, this may be caused because the device is just started and has an unstable signal. Therefore, the to-be-connected device may perform operation 201 again after waiting for a period of time, to scan the SSID broadcast by the routing device.

If it is determined that there is no routing device that is just started in the routing devices, operation 206 is performed.

Operation 206: The to-be-connected device chooses to connect to a routing device with best effective link quality.

To be specific, the to-be-connected device calculates effective link quality each routing device that "has no connectivity to the master device and that is not just started", and chooses to connect to a device with best effective link quality with the to-be-connected device.

In specific implementation, for each device that "has no connectivity to the master device and that is not just started", the effective link quality between the to-be-connected device and the device is calculated based on link quality in a networking message broadcast by the device and an RSSI value between the to-be-connected device and the device. Specifically, the effective link quality between the to-be-connected device and the device=link quality of the device+ an RSSI value corresponding to the device/n. n is a value greater than 1, and the value of n depends on a wireless chip (for example, a Wi-Fi chip) of the to-be-connected device. If the wireless chip disposed in the to-be-connected device changes, the value of n changes. In addition, the RSSI value corresponding to the device is the RSSI value between the to-be-connected device and the device. The to-be-connected device may measure the RSSI value between the to-be-connected device and the device when obtaining a wireless signal of the device by scanning.

It should be noted that if the IsConnectOK field in the SSID broadcast by the routing device indicates that the routing device has no connectivity to the master device, and the routing device is not just restarted, it indicates that the routing device has no network connectivity. In this case, the to-be-connected device may choose to connect to a device with best signal quality in the devices.

Figure 10:
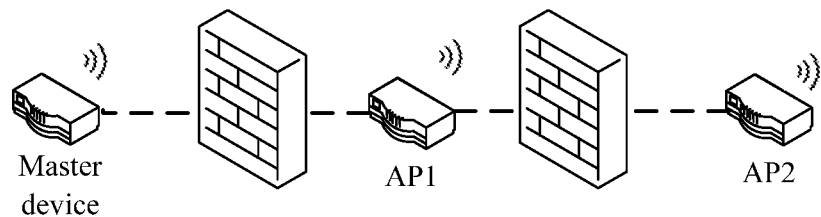
FIG. 10 is a schematic diagram of a connection scenario according to an embodiment of the present invention.

The following describes a distributed connection method provided in this embodiment of the present invention with reference to two scenarios, and details are as follows:

Scenario 1: Referring to FIG. 10, an AP1 is separated from a master device by a wall, and an AP2 is separated from the master device by two walls. Assuming that link quality of the master device, the AP1, and the AP2 are all good in a current network status. When the master device, the AP1, and the AP2 are power off at the same time and then powered on at the same time, operations for reassembling an entire network are as follows:

Operation 1: Assuming that the AP2 is started earlier than the AP1, after being started, the AP2 receives a networking message broadcast by the master device, and the AP2 calculates effective link quality with the master device. The effective link quality between the AP2 and the master device is not ideal enough (for example, −70 dBm) because the AP2 is separated from the master device by two walls, and the master AP is just restarted, the AP2 performs scanning after waiting for 3 s.

Operation 2: The AP1 is restarted and discovers that the master device is restarted; the AP1 learns, through calculation, that effective link quality between the AP1 and the master device is −40 dBm; and the AP1 is directly connected to the master device if the link quality is acceptable.

Operation 3: After waiting for 3 s, the AP2 scans networking messages broadcast by the master device and the AP1; learns, through calculation, that effective link quality between the AP2 and the AP1 (for example, −50 dBm) is better than effective link quality between the AP2 and the master device (for example, −70 dBm), and the AP2 chooses to connect to the AP1 that has better link quality between the AP1 and the AP2.

Figure 11:
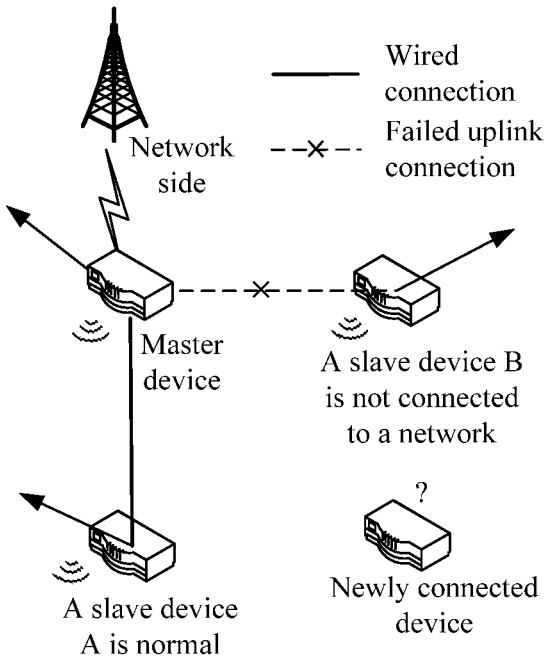
FIG. 11 is a schematic diagram of another connection scenario according to an embodiment of the present invention.

Scenario 2: Referring to FIG. 11, a master device directly is connected to a network side, and a slave device A is directly connected to the master device, and a slave device B is not connected to the network. The master device, the slave device A, and the slave device B each broadcast a networking message to the outside. For details about specific values of fields in the networking messages from the devices, refer to FIG. 11. Specifically, in the networking message broadcast by the master device, an IsConnectOK field is 1, a LinkQuality field is 0, a RebootBit field is 0, and a Mode field is 1. In the networking message broadcast by the slave device A, an IsConnectOK field is 1, a LinkQuality field is 30, a RebootBit field is 0, and a Mode field is 2. In the networking message broadcast by the slave device B, an IsConnectOK field is 0, a LinkQuality field is 40, a RebootBit field is 0, and a Mode field is 2.

Operation 1: A newly connected slave device C obtains, by scanning, three networking messages, where the IsConnectOK field in the networking message from the slave device B is 0, indicating that the device is not connected to the network, and the slave device C does not connect to the slave device B.

Operation 2: The slave device C calculates actual link quality with the master device. Specifically, when obtaining a wireless signal of the master device by scanning, the slave device C may measure an RSSI value between the slave device C and the master device, for example, −100 dBm, and the slave device C receives information that link quality broadcast by the master device is 0, that is, the link quality of the master device is 0. Therefore, effective link quality between the slave device C and the master device is 0+(−100 dBm/n). Using n=2 as an example, the effective link quality between the slave device C and the master device is −50 dBm. In this case, the slave device C is not satisfied with the link quality and continues to perform scanning.

Operation 3: The slave device C calculates actual link quality with the slave device A. Specifically, when obtaining a wireless signal of the slave device A by scanning, the slave device C may measure an RSSI value between the slave device C and the slave device A, for example, −30 dBm, and the slave device C receives information that the LinkQuality field in the networking message broadcast by the slave device A is 30, that is, link quality of the slave device A is −30 dBm. Therefore, effective link quality between the slave device C and the slave device A is −30+(−30 dBm/n). Also using n=2 as an example, the effective link quality between the slave device C and the slave device A is −45 dBm, greater than the link quality −50 dBm between the slave device C and the master device. Therefore, the slave C connects to the slave device A.

In the connection method provided in the embodiments of the present invention, a device in a current network broadcasts its link quality and a connectivity state between the device and a master device. A device to be connected to the network scans networking messages broadcast by devices in the network, and determines, based on link quality and a connectivity state in a networking message broadcast by each device and signal strength of each routing device scanned by the device to be connected to the network, a device that has connectivity to the master device and that has best network quality. In this way, the device to be connected to the network connects to the device with the best network quality. Therefore, every level of device in a Wi-Fi network can independently select an optimal link reaching the master device, to connect to the master device, avoiding a case in which a connected device has no network connectivity. This can satisfy that a terminal device can obtain best Internet accessing experience by connecting to any level of routing device in the Wi-Fi network. In addition, because a link status of every level of device is optimal, networking efficiency is improved, and a time of synchronizing parameters between the master device and a slave device is reduced. Also, because a newly connected device can choose to connect to an optimal device, it is avoided that the newly connected device has no network connectivity after being connected. Therefore, a current network may alternatively be extended from a level 2 network to a multi-level network, thereby greatly improving coverage of a small local area network.

Figure 12:
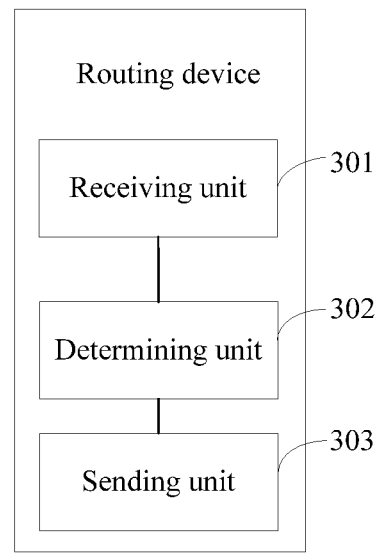
FIG. 12 is a schematic structural diagram of a routing device according to an embodiment of the present invention.

An embodiment of the present invention provides a routing device, where the routing device may be a master device or a slave device in the system shown in FIG. 1 in the embodiments of the present invention. When function module division is performed based on corresponding functions, FIG. 12 is a possible schematic structural diagram of the foregoing routing device. As shown in FIG. 12, the routing device includes a receiving unit 301, a determining unit 302, and a sending unit 303.

The receiving unit 301 is configured to support the routing device in performing the operation of "receiving a networking message broadcast by an upstream device" in the foregoing embodiment, and/or other processes in the technology described in this specification.

The determining unit 302 is configured to support the routing device in performing operation 101 in the foregoing embodiment, and/or other processes in the technology described in this specification.

The sending unit 303 is configured to support the routing device in performing operation 102 in the foregoing embodiment, and/or other processes in the technology described in this specification.

It should be noted that all related content of the operations in the foregoing method embodiment may be cited to describe functions of corresponding function modules. Details are not described herein again.

Figure 13:
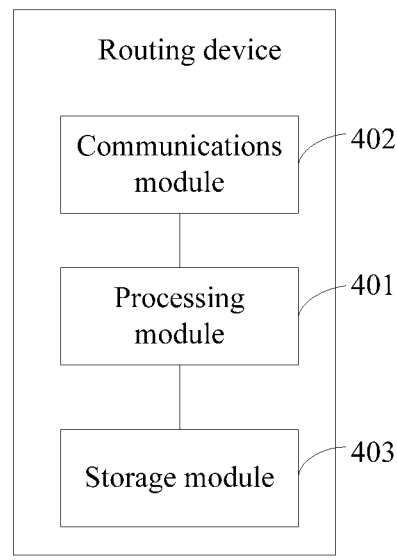
FIG. 13 is another schematic structural diagram of a routing device according to an embodiment of the present invention.

For example, when an integrated unit is used, a schematic structural diagram of the routing device provided in this embodiment of this application is shown in FIG. 13. In FIG. 13, the routing device includes a processing module 401 and a communications module 402. The processing module 401 is configured to control and manage an action of the routing device, such as performing the operation performed by the determining unit 302 and/or performing other processes in the technology described in this specification. The communications module 402 is configured to support interaction between the routing device and another device, such as performing the operations performed by the receiving unit 301 and the sending unit 303. As shown in FIG. 13, the routing device may further include a storage module 403, where the storage module 403 is configured to store program code and data of the routing device.

Figure 14:
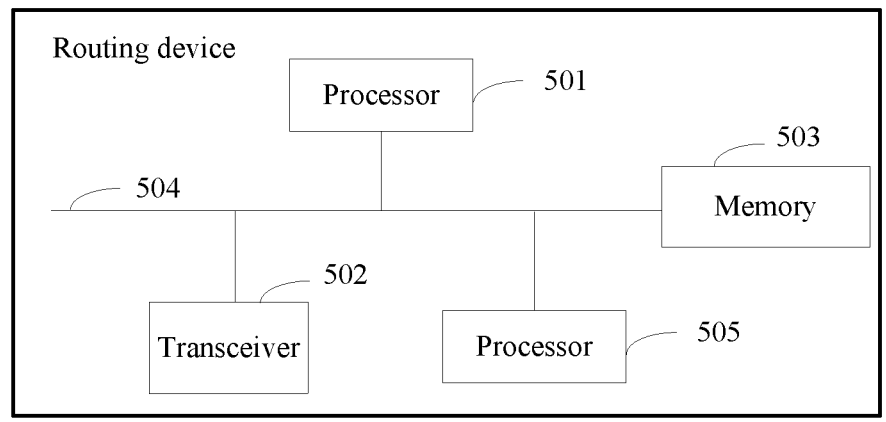
FIG. 14 is another schematic structural diagram of a routing device according to an embodiment of the present invention.

When the processing module 401 is a processor 501, the communications module 402 is a transceiver 502, and the storage module 403 is a memory 503, the routing device may be a routing device shown in FIG. 14. If the transceiver is a receiver and a transmitter, the receiver performs the operation performed by the receiving unit 301, and the transmitter performs the operation performed by the sending unit 303.

Components of the routing device are specifically described below with reference to FIG. 14.

The processor 501 is a control center of the routing device, and may be a processor or may be a general term for a plurality of processing elements. For example, the processor 501 is a central processing unit (CPU), or may be an application-specific integrated circuit (ASIC), or one or more integrated circuits configured to implement the embodiments of the present invention, for example, one or more microprocessors (e.g., digital signal processor or DSP) or one or more field programmable gate arrays (FPGA).

The processor 501 may perform various functions of the routing device by running or executing a software program stored in the memory 503 and calling data stored in the memory 503.

In specific implementation, in an embodiment, the processor 501 may include one or more CPUs, for example, a CPU 0 and a CPU 1 shown in FIG. 14.

In specific implementation, in an embodiment, the routing device may include a plurality of processors, for example, the processor 501 and a processor 505 shown in FIG. 14. Each of the processors may be a single-core processor (single-CPU) or may be a multi-core processor (multi-CPU). The processor herein may be one or more devices, circuits, and/or processing cores for processing data (such as a computer program instruction).

The memory 503 may be a read-only memory (ROM) or another type of static storage device that can store static information and instructions, a random access memory (RAM) or another type of dynamic storage device that can store information and instructions, or an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction or data structure form and that can be accessed by a computer, but is not limited thereto. The memory 503 may exist independently, and is connected to the processor 501 through a communications bus 504. The memory 503 may alternatively be integrated with the processor 501.

The memory 503 is configured to store a software program for executing the embodiments of the present invention, and execution of the software program is controlled by the processor 501.

The transceiver 502, an apparatus using any type of transceiver, is configured to communicate with another routing device in the system in FIG. 1. The transceiver 502 may also be configured to communicate with a communications network, such as an Ethernet, a radio access network (RAN), and a wireless local area network (WLAN). The transceiver 502 may include a receiving unit for implementing a receiving function, and a sending unit for implementing a sending function.

The communications bus 504 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus is represented by using only one bold line in FIG. 14, but it does not mean that there is only one bus or one type of bus.

The device structure shown in FIG. 14 does not constitute any limitation on the routing device, and may include more or less components than those shown in the figure, a combination of some components, or components in different arrangements. It should be noted that when the processor

501 of the routing device runs code stored in the memory 503, the processor 501 may perform the operation performed by the calculation module (refer to FIG. 5) of the routing device: performing link quality calculation to determine whether to connect to its upstream device; and when running the code stored in the memory 503, the processor 501 may further perform the operation performed by the broadcast module (refer to FIG. 5) through the transceiver 502: broadcasting a networking message of the routing device.

Figure 15:
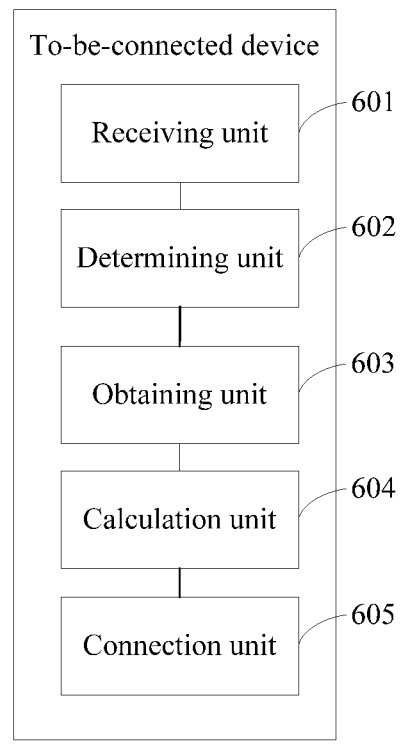
FIG. 15 is a schematic structural diagram of a to-be-connected device according to an embodiment of the present invention.

When function module division is performed based on corresponding functions, FIG. 15 is a possible schematic structural diagram of the to-be-connected device in the foregoing embodiment. As shown in FIG. 15, the to-be-connected device includes a receiving unit 601, a determining unit 602, an obtaining unit 603, a calculation unit 604, and a connection unit 605.

The receiving unit 601 is configured to support the to-be-connected device in performing operations 103 and 201 in the foregoing embodiments, and/or other processes in the technology described in this specification.

The determining unit 602 is configured to support the to-be-connected device in performing operations 104 and 203/204b in the foregoing embodiments, and/or other processes in the technology described in this specification.

The obtaining unit 603 is configured to support the to-be-connected device in performing the action of obtaining an RSSI value in operation 105 in the foregoing embodiment, and/or other processes in the technology described in this specification.

The calculation unit 604 is configured to support the to-be-connected device in performing the action of calculating effective link quality in operation 105 in the foregoing embodiment, and/or other processes in the technology described in this specification.

The connection unit 605 is configured to support the to-be-connected device in performing operation 106 in the foregoing embodiment, and/or other processes in the technology described in this specification.

It should be noted that all related content of the operations in the foregoing method embodiment may be cited to describe functions of corresponding function modules. Details are not described herein again.

Figure 16:
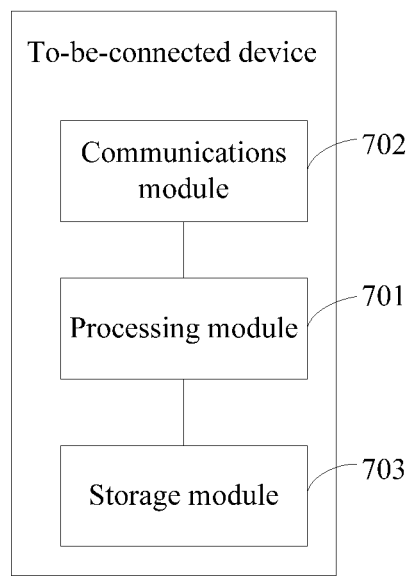
FIG. 16 is another schematic structural diagram of a to-be-connected device according to an embodiment of the present invention.

For example, when an integrated unit is used, a schematic structural diagram of the to-be-connected device provided in this embodiment of this application is shown in FIG. 16. In FIG. 16, the to-be-connected device includes a processing module 701 and a communications module 702. The processing module 701 is configured to control and manage an action of the to-be-connected device, such as performing the operations performed by the determining unit 602, the obtaining unit 603, the calculation unit 604, and the connection unit 605 and/or performing other processes in the technology described in this specification. The communications module 702 is configured to support interaction between the to-be-connected device and another device, such as performing the operation performed by the receiving unit 601. As shown in FIG. 16, the to-be-connected device may further include a storage module 703, where the storage module 703 is configured to store program code and data of the to-be-connected device.

Figure 17:
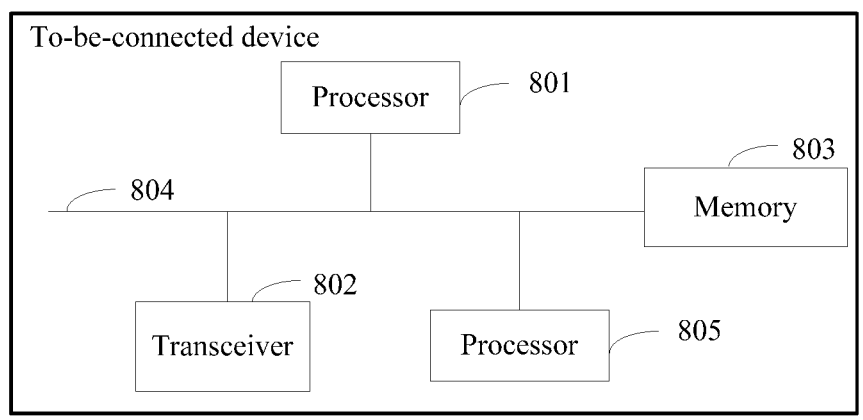
FIG. 17 is another schematic structural diagram of a to-be-connected device according to an embodiment of the present invention.

When the processing module 701 is a processor 801, the communications module 702 is a transceiver 802, and the storage module 703 is a memory 803, the to-be-connected device is a to-be-connected device shown in FIG. 17.

Components of the routing device are specifically described below with reference to FIG. 17.

The processor 801 is a control center of the routing device, and may be a processor or may be a general term for a plurality of processing elements. For example, the processor 801 is a central processing unit (CPU), or may be an application-specific integrated circuit (ASIC), or one or more integrated circuits configured to implement the embodiments of the present invention, for example, one or more microprocessors (e.g., digital signal processor or DSP) or one or more field programmable gate arrays (FPGA).

The processor 801 may perform various functions of the routing device by running or executing a software program stored in the memory 803 and calling data stored in the memory 803.

In specific implementation, in an embodiment, the processor 801 may include one or more CPUs, for example, a CPU 0 and a CPU 1 shown in FIG. 17.

In specific implementation, in an embodiment, the routing device may include a plurality of processors, for example, the processor 801 and a processor 805 shown in FIG. 17. Each of the processors may be a single-core processor (single-CPU) or may be a multi-core processor (multi-CPU). The processor herein may be one or more devices, circuits, and/or processing cores for processing data (such as a computer program instruction).

The memory 803 may be a read-only memory (ROM) or another type of static storage device that can store static information and instructions, a random access memory (RAM) or another type of dynamic storage device that can store information and instructions, or an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction or data structure form and that can be accessed by a computer, but is not limited thereto. The memory 803 may exist independently, and is connected to the processor 801 through a communications bus 804. The memory 803 may alternatively be integrated with the processor 801.

The memory 803 is configured to store a software program for executing the embodiments of the present invention, and execution of the software program is controlled by the processor 801.

The transceiver 802, an apparatus using any type of transceiver, is configured to communicate with another routing device in the system in FIG. 1. The transceiver 502 may also be configured to communicate with a communications network, such as an Ethernet, a radio access network (RAN), and a wireless local area network (WLAN). The transceiver 802 may include a receiving unit for implementing a receiving function, and a sending unit for implementing a sending function.

The communications bus 804 may be an industry standard architecture (ISA) bus, a peripheral component interconnect (PCI) bus, an extended industry standard architecture (EISA) bus, or the like. The bus can be divided into an address bus, a data bus, a control bus. For ease of representation, the bus is represented by using only one bold line in FIG. 17, but it does not mean that there is only one bus or one type of bus.

The device structure shown in FIG. 17 does not constitute any limitation on the routing device, and may include more or less components than those shown in the figure, a combination of some components, or components in different arrangements.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the procedures or functions in this application are generated. The computer may be a general purpose computer, a dedicated computer, a computer network, or another programmable device. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, and a magnetic tape), an optical medium (for example, a DVD), or a semiconductor medium (for example, a solid state disk Solid State Disk (SSD)), or the like.

Through the description of the foregoing embodiments, a person skilled in the art can clearly understand that for the convenience and brevity of the description, only the foregoing function module division is illustrated. In actual application, the foregoing functions can be allocated to different function modules based on a need to be implemented, that is, an internal structure of an apparatus is divided into different function modules to implement all or some of the functions described above.

In the several embodiments provided in this application, it should be understood that the disclosed system, apparatus, and method may be implemented in another manner. For example, the apparatus embodiments described above are merely examples. For example, the module or unit division is merely logical function division and may be other division in actual implementation. For example, a plurality of units or components may be combined or integrated into another apparatus, or some features may be ignored or not performed. In addition, mutual couplings, direct couplings or communication connections shown or discussed may be indirect couplings or communication connections implemented through some interfaces, apparatuses or units, and may be in electrical, mechanical or other forms.

The units described as separate components may or may not be physically separate. Components displayed as units may be one or more physical units. To be specific, such components may be located in one place, or may be distributed onto a plurality of network units. Some or all of units may be selected based on an actual need to implement the solutions of the embodiments.

In addition, the functional units in the embodiments of this application may be integrated into one processing unit, or each of the units may exist alone physically, or two or more units may be integrated into one unit. The foregoing integrated unit can be implemented in a form of hardware or a software functional unit.

If the integrated unit is implemented in a form of a software functional unit and sold or used as a standalone product, the integrated unit may be stored in a computer readable storage medium. Based on such an understanding, the technical solutions of the embodiments in this application essentially, or the part contributing to the prior art, or all or some of the technical solutions may be implemented in a form of a software product. The software product is stored in a storage medium, including several instructions for instructing a computer control device (which may be a single chip microcomputer, a server, a network control device, a chip, or the like) or a processor (processor) to perform all or some of the operations in the method of the embodiments of this application. The foregoing storage medium includes various media that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A network system, comprising:
at least two routing devices and a to-be-connected device, wherein the at least two routing devices comprise a master device and at least one slave device;
wherein the master device is directly connected to a network side, and the at least one slave device is directly or indirectly connected to the master device;
wherein each of the at least two routing devices broadcasts a first message that comprises a connectivity state and link quality, wherein the connectivity state indicates a connectivity state between the routing device and the master device, and wherein the link quality indicates link quality of a link between the routing device and the master device;
wherein the to-be-connected device receives at least two first messages broadcast by the at least two routing devices;
wherein the to-be-connected device determines, based on the at least two first messages, at least one first-type routing device in the at least two routing devices that has connectivity to the master device;
wherein the to-be-connected device obtains received signal strength of the at least one first-type routing device;
wherein the to-be-connected device calculates effective link quality between the to-be-connected device and each first-type routing device based on link quality in a first message broadcast by the at least one first-type routing device and the signal strength of the at least one first-type routing device; and
wherein the to-be-connected device connects to one of the at least two routing devices with best link quality with the to-be-connected device in the first-type routing device.

2. The network system according to claim 1, wherein if the routing device is the master device, the connectivity state is connected and the link quality is 0 dBm.

3. A network connection method, comprising:
determining, by a routing device, a connectivity state and link quality, wherein the connectivity state indicates a connectivity state between the routing device and a master device, and the link quality indicates link quality of a link between the routing device and the master device, wherein the routing device is the master device or a slave device, the master device being directly connected to a network side, and the slave device being directly or indirectly connected to the master device; and broadcasting, by the routing device, a first message, wherein the first message comprises the connectivity state and the link quality;

wherein when the routing device is the slave device, the determining, by the routing device, of the connectivity state comprises:

receiving, by the routing device, a first message broadcast by an upstream device, and using a connectivity state in the first message broadcast by the upstream device as connectivity;

wherein the determining, by the routing device, of the connectivity state based on a detection result specifically comprises:

when the detection result is that the routing device is disconnected from the master device, determining that the connectivity state is a first value, wherein the first value indicates that the routing device has no connectivity to the master device; and when the detection result is that the routing device is connected to the master device, determining that the connectivity state is a second value, wherein the second value indicates that the routing device has connectivity to the master device.

4. The method according to claim 3, wherein the method further comprises:

determining, by the routing device, a startup state, wherein the startup state indicates whether the routing device is started within a preset duration; and wherein the first message further comprises the startup state.

5. The method according to claim 3, wherein if the routing device is the master device, the connectivity state is connected and the link quality is 0 dBm.

6. The method according to claim 3, wherein the determining, by the routing device, of the connectivity state comprises:

when the routing device determines that the master device has received a heartbeat packet, determining that the connectivity state is a second value, wherein the second value indicates that the routing device has connectivity to the master device; and when the routing device determines that none of heartbeat packets consecutively sent N times is received by the master device, determining that the connectivity state is a first value, wherein the first value indicates that the routing device has no connectivity to the master device; and N is an integer greater than 1.

7. The method according to claim 3, wherein the determining, by the routing device, of the link quality comprises:

determining, by the routing device, the link quality of the upstream device and a received signal strength indicator (RSSI) value between the routing device and the upstream device; and when the link quality of the upstream device is less than the RSSI value, determining that the link quality is a sum of the link quality of the upstream device and a link attenuation value; or when the RSSI value is less than the link quality of the upstream device, determining that the link quality is a sum of the RSSI value and a link attenuation value, wherein the link attenuation value is a signal attenuation quantity on a link between the routing device and the upstream device.

8. The method according to claim 7, wherein the determining, by the routing device, of the link quality of the upstream device comprises:

receiving the first message broadcast by the upstream device, and determining link quality in the first message broadcast by the upstream device as the link quality of the upstream device.

9. The method according to claim 7, wherein the determining, by the routing device, of the RSSI value between the routing device and the upstream device specifically comprises:

when the link between the routing device and the upstream device is a wired link, determining that the RSSI value is zero.

10. A network connection method, comprising:

receiving, by a to-be-connected device, at least two first messages broadcast by at least two routing devices, wherein each of the at least two first messages comprises link quality and a connectivity state of a routing device that broadcasts the first message, wherein the connectivity state indicates a connectivity state between the routing device that broadcasts the first message and a master device, wherein the link quality indicates link quality of a link between the routing device that broadcasts the first message and the master device, wherein the at least two routing devices comprise the master device and at least one slave device, and wherein the master device is directly connected to a network side;

determining, by the to-be-connected device based on the at least two first messages, at least one first-type routing device in the at least two routing devices that has connectivity to the master device;

obtaining, by the to-be-connected device, received signal strength of the at least one first-type routing device;

calculating, by the to-be-connected device, effective link quality between the to-be-connected device and each first-type routing device based on link quality in a first message broadcast by the at least one first-type routing device and the signal strength of the at least one first-type routing device; and connecting the to-be-connected device to one of the at least two routing devices with best link quality with the to-be-connected device in the at least one first-type routing device.

11. The method according to claim 10, wherein the first message further comprises a startup state, wherein the startup state indicates whether the routing device that broadcasts the first message is started within a preset duration.

12. The method according to claim 10, wherein the method further comprises:

when there is no first-type routing device in the at least two routing devices, determining, based on a startup state in the at least two first messages, whether there is a second-type routing device that is started within a preset duration in the at least two routing devices; and when there is a second-type routing device in the at least two routing devices, receiving, by the to-be-connected device after waiting for a specific duration, a first message broadcast by the at least two routing devices.

13. The method according to claim 10, wherein:

for each first-type networking device, the effective link quality between the to-be-connected device and the first-type routing device=link quality of the first-type routing device+(a received signal strength indicator RSSI value between the first-type routing device and the to-be-connected device/n), wherein n is a number greater than 1.

14. The method according to claim 3, wherein when the routing device is the slave device, the determining, by the routing device, the connectivity state comprises:
   detecting, by the routing device, a connectivity state with the master device periodically, and determining the connectivity state based on the detection result; or
   sending, by the routing device, a heartbeat packet to the master device periodically, and determining the connectivity state based on reception of the heartbeat packet by the master device.

15. The method according to claim 7, wherein the determining, by the routing device, of the link quality of the upstream device comprises:
   receiving the link quality of the upstream device sent by the master device.

16. The method according to claim 7, wherein the determining, by the routing device, of the RSSI value between the routing device and the upstream device comprises:
   measuring, by the routing device, the RSSI value when the link between the routing device and the upstream device is a wireless link.

17. The method according to claim 10, wherein when the routing device is the master device, the connectivity state is connected and the link quality is 0 dBm.

* * * * *